United States Patent
Fujita et al.

(10) Patent No.: US 6,831,130 B2
(45) Date of Patent: Dec. 14, 2004

(54) COMPOSITION OF CROSSLINKABLE POLYETHER, CROSSLINKABLE VINYL POLYMER AND COMPATIBILIZER

(75) Inventors: Nao Fujita, Osaka (JP); Yasuo Shimizu, Osaka (JP); Nobuhiro Hasegawa, Settsu (JP); Yoshiki Nakagawa, Settsu (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 10/296,541

(22) PCT Filed: May 24, 2001

(86) PCT No.: PCT/JP01/04369

§ 371 (c)(1),
(2), (4) Date: Apr. 4, 2003

(87) PCT Pub. No.: WO01/90224

PCT Pub. Date: Nov. 29, 2001

(65) Prior Publication Data

US 2003/0176576 A1 Sep. 18, 2003

(30) Foreign Application Priority Data

May 24, 2000 (JP) .................................. 2000-153778
May 24, 2000 (JP) .................................. 2000-153779
Jan. 23, 2001 (JP) .................................... 2001-15074

(51) Int. Cl.$^7$ .................. C08L 33/04; C08L 33/14; C08L 71/02; C08L 83/06
(52) U.S. Cl. .................... 525/101; 525/100; 525/102; 525/103; 525/104; 525/125; 525/187
(58) Field of Search ................... 525/187, 100, 525/101, 102, 103, 104, 125

(56) References Cited

U.S. PATENT DOCUMENTS 4,593,068 A * 6/1986 Hirose et al. ............... 525/100

FOREIGN PATENT DOCUMENTS

| | | |
|---|---|---|
| EP | 0 108 946 A2 | 5/1984 |
| EP | 0 265 929 A2 | 5/1988 |
| EP | 1 000 980 A1 | 5/2000 |
| JP | 45-36319 | 11/1970 |
| JP | 46-12154 | 3/1971 |
| JP | 49-32673 | 9/1974 |
| JP | 50-156599 | 12/1975 |
| JP | 51-73561 | 6/1976 |
| JP | 54-6096 | 1/1979 |
| JP | 55-13767 | 1/1980 |
| JP | 55-13768 | 1/1980 |
| JP | 55-82123 | 6/1980 |
| JP | 55-123620 | 9/1980 |
| JP | 55-131021 | 10/1980 |
| JP | 55-131022 | 10/1980 |
| JP | 55-135135 | 10/1980 |
| JP | 55-137129 | 10/1980 |
| JP | 1-247403 | 10/1989 |
| JP | 2-42367 | 9/1990 |
| JP | 2-44845 | 10/1990 |
| JP | 3-72527 | 3/1991 |
| JP | 4-56066 | 9/1992 |
| JP | 4-69667 | 11/1992 |
| JP | 5-255415 | 10/1993 |
| JP | 5-262808 | 10/1993 |
| JP | 6-116466 | 4/1994 |
| JP | 6-172631 | 6/1994 |
| JP | 06172631 A * 6/1994 ........... C08L/71/02 |
| JP | 6-211922 | 8/1994 |
| JP | 8-225707 | 9/1996 |
| JP | 08225707 A * 9/1996 ........... C08L/33/14 |
| JP | 9-272714 | 10/1997 |
| JP | 9-272715 | 10/1997 |
| JP | 11-5815 | 1/1999 |
| JP | 11-80249 | 3/1999 |
| JP | 11-80250 | 3/1999 |
| JP | 11-80570 | 3/1999 |
| JP | 11-80571 | 3/1999 |
| JP | 11-100433 | 4/1999 |
| JP | 11-116606 | 4/1999 |
| JP | 11-116617 | 4/1999 |
| JP | 11-116763 | 4/1999 |
| JP | 11116763 A * 4/1999 ............. C08F/2/42 |
| JP | 11-130931 | 5/1999 |
| JP | 2-52935 | 11/1999 |
| JP | 2000-72816 | 3/2000 |
| JP | 2000-109676 | 4/2000 |
| JP | 2000109676 A * 4/2000 ........... C08L/71/02 |
| JP | 2000-129146 | 5/2000 |
| JP | 2000-281718 | 10/2000 |

\* cited by examiner

Primary Examiner—Robert Seller
(74) Attorney, Agent, or Firm—Connolly Bove Lodge & Hutz LLP

(57) ABSTRACT

A curable composition comprises a polyether polymer having at least one crosslinkable functional group and a vinyl polymer compatible therewith having at least one crosslinkable functional group at a terminus. Another aspect includes a compatibilizing agent capable of compatibilizing the polyether polymer and vinyl polymer when added to the mixture thereof.

23 Claims, No Drawings

COMPOSITION OF CROSSLINKABLE POLYETHER, CROSSLINKABLE VINYL POLYMER AND COMPATIBILIZER

TECHNICAL FIELD

The present invention relates to a curable composition comprising a crosslinkable functional group-containing vinyl polymer and a crosslinkable functional group-containing polyether polymer and to a compatibilizing agent for compatibilizing the above polymers with each other.

BACKGROUND ART

Unlike polymers obtainable by ionic polymerization or polycondensation, functional group-containing vinyl polymers, in particular functional group-terminated vinyl polymers, obtainable by radical polymerization have scarcely been put to practical use. Among vinyl polymers, (meth)acrylic polymers have such characteristics as high weatherability and transparency that polyether polymers, hydrocarbon polymers or polyester polymers cannot have, and (meth)acrylic polymers having an alkenyl or crosslinking silyl group(s) on a side chain(s) are currently used in highly weather-resistant coating compositions and the like. On the other hand, it is not easy to control the polymerization of acrylic polymers because of side reactions, and it is very difficult to introduce a functional group into such polymers at one or both ends.

If vinyl polymers having an alkenyl group at a molecular chain terminus or termini can be obtained by a simple and easy method, it becomes possible to obtain cured products superior in cured product physical properties to cured products from vinyl polymers having a crosslinking group(s) on a side chain(s) Therefore, a number of researchers have so far made investigations concerning the method for the production thereof. However, it is not easy to produce them on a commercial scale. In Japanese Kokai Publication Hei-01-247403 and Japanese Kokai Publication Hei-05-255415, for instance, there is disclosed a method of synthesizing alkenyl-terminated (meth)acrylic polymers which uses an alkenyl group-containing disulfide as a chain transfer agent.

Japanese Kokai Publication Hei-05-262808 discloses a method of synthesizing alkenyl-terminated (meth)acrylic polymers which comprises synthesizing a vinyl polymer having a hydroxyl group at each end using a hydroxyl group-containing disulfide and further utilizing the reactivity of each hydroxyl group.

Japanese Kokai Publication Hei-05-211922 discloses a method of synthesizing silyl group-terminated (meth)acrylic polymers which comprises synthesizing a vinyl polymer having a hydroxyl group at each end using a hydroxyl group-containing polysulfide and the reactivity of each hydroxyl group.

These methods can hardly ensure that a desired functional group will be introduced at each of both ends. Hence, cured products having satisfactory characteristics cannot be obtained. For introducing a functional group at each of both ends without fail, a chain transfer agent must be used in large amounts, and this is a problem from the production process viewpoint. In addition, these methods use an ordinary method of radical polymerization, so that it is difficult to control the molecular weight and molecular weight distribution (ratio of weight average molecular weight to number average molecular weight) of the product polymer.

In view of such a state of the art, the present inventors have so far made a number of inventions relating to various crosslinkable functional group-terminated vinyl polymers, methods of producing the same, curable compositions comprising the same, and uses thereof (cf. Japanese Kokai Publication Hei-11-080249, Japanese Kokai Publication Hei-11-080250, Japanese Kokai Publication Hei-11-005815, Japanese Kokai Publication Hei-11-116617, Japanese Kokai Publication Hei-11-116606, Japanese Kokai Publication Hei-11-080571, Japanese Kokai Publication Hei-11-080570, Japanese Kokai Publication Hei-11-130931, Japanese Kokai Publication Hei-11-100433, Japanese Kokai Publication Hei-11-116763, Japanese Kokai Publication Hei-09-272714, and Japanese Kokai Publication Hei-09-272715, among others).

For example, vinyl polymers having a silicon-containing group comprising hydroxyl or hydrolyzable group(s) bound to a silicon atom and capable of crosslinking under siloxane bond formation (hereinafter, such silicon-containing group is also referred to as "crosslinkable silyl group") or cured products obtainable from compositions comprising the same are excellent in heat resistance and weatherability and can be used in various fields of application which include, but are not limited to, sealing materials, for example sealing materials such as elastic sealing materials for building and construction and sealing materials for laminated glass, electric and electronic part materials such as solar cell back sealers, electric insulating materials such as wire/cable insulating sheath, pressure sensitive adhesive materials, adhesives, elastic adhesives, paints, powder paints, coating compositions, foamed bodies, potting materials for electric and electronic use, films, gaskets, casting materials, various molding materials, and rustproof and waterproof sealants for end faces (cut sections) of net glass or laminated glass.

On the other hand, polyether polymers having at least one crosslinking silyl group are disclosed, for example, in Japanese Kokoku Publication Sho-45-36319, Japanese Kokoku Publication Sho-46-12154, Japanese Kokoku Publication Sho-46-30741 and Japanese Kokoku Publication Sho-49-32673, Japanese Kokai Publication Sho-50-156599, Japanese Kokai Publication Sho-51-73561, Japanese Kokai Publication Sho-54-6096, Japanese Kokai Publication Sho-55-13767, Japanese Kokai Publication Sho-55-13768, Japanese Kokai Publication Sho-55-82123, Japanese Kokai Publication Sho-55-123620, Japanese Kokai Publication Sho-55-125121, Japanese Kokai Publication Sho-55-131021, Japanese Kokai Publication Sho-55-131022, Japanese Kokai Publication Sho-55-135135 and Japanese Kokai Publication Sho-55-137129, and Japanese Kokai Publication Hei-03-72527 and Japanese Kokai Publication Hei-03-97825. When cured, they give high elongation cured products and therefore are used in elastic sealing materials and the like mainly intended for use in building and construction.

However, these polyethers, in particular polyethers having a main chain comprising a polypropylene oxide, have a problem in that hydrogen atoms each bound to a tertiary carbon atom are readily oxidized, hence the weatherability becomes poor, if no antioxidant is used. To solve this problem, the present inventors have already proposed, in Japanese Kokoku Publication Hei-O$_2$-42367 and Japanese Kokoku Publication Hei-O$_2$-44845, a curable composition improved in weatherability as a result of blending an acrylic polymer having at least one crosslinkable silyl group with a polyether polymer having at least one crosslinkable silyl group. Further, Japanese Kokoku Publication Hei-04-69667, there is disclosed a sealing material composition comprising a blend of an acrylic polymer having an alkoxysilyl group at each of both molecular ends as produced by using a chain transfer agent with a polyether polymer having an alkoxysilyl group at each of both molecular ends.

That vinyl polymer having at least one crosslinkable functional group which is to be blended with the polyether polymer having at least one crosslinkable functional group is generally produced by using a crosslinkable functional group-containing radical polymerization initiator or chain transfer agent. Therefore, it is difficult to attain a high percentage of crosslinkable functional group introduction at both ends. As a result, there arises a problem, namely the gel fraction of cured products decreases.

On the other hand, the combined use of a crosslinkable functional group-containing monomer is required for obtaining cured products with a satisfactory gel fraction. In this case, a problem arises, namely the high elongation characteristics intrinsic in polyether polymers are impaired. In this case, the elongation at break, in particular, decreases and, accordingly, the range of application of the composition in question is drastically restricted. Therefore, in using the same as a sealing material, improvements in weatherability can be attained only by sacrificing some or other physical characteristic(s), for example increase in modulus, decrease in elongation, worsening of residual tack, decrease in gel fraction, etc. In addition, the (meth)acrylic polymer used there is a product synthesized by free radical polymerization and, therefore, has a broad molecular weight distribution and a high viscosity, causing a problem that the mixture thereof with a polyether polymer also shows a high viscosity.

Concerning this problem, Japanese Kokai Publication Hei-11-116763 proposes to obtain a curable composition high in gel fraction and excellent in weatherability, without impairing the high elongation characteristic intrinsic in a crosslinkable functional group-containing polyether polymer, by using a low-viscosity vinyl polymer having a terminal crosslinkable functional group introduced thereinto with a high percentage. In this case, however, the compatibility of the two polymers may be poor in certain instances according to the molecular weight and molecular weight distribution of the vinyl polymer and/or polyether polymer and to the blending ratio of these two polymers. In that case, the curable composition resulting from blending, when stored for a long period of time, may undergo phase separation, for instance, hence the storage stability thereof may deteriorate. Furthermore, cured products obtainable from a composition with insufficient compatibility are inferior in homogeneity, so that good mechanical and physical properties may not be realized.

SUMMARY OF THE INVENTION

It is an object of the present invention to provide a curable composition which comprises a crosslinkable functional group-containing vinyl polymer and a crosslinkable functional group-containing polyether polymer and which has good storage stability and can give cured products retaining the high elongation characteristic originating from the polyether polymer and showing a high gel fraction and good weatherability.

Thus, the present invention provides a curable composition which comprises the following two components:

(I) a polyether polymer having at least one crosslinkable functional group and (II) a vinyl polymer which is compatible with said polyether polymer, has a weight average molecular weight (Mw)-to-number average molecular weight (Mn) ratio (Mw/Mn) of less than 1.8 as determined by gel permeation chromatography and has at least one crosslinkable functional group at a polymer terminus.

The present invention also provides a curable composition which comprises the following two components:

(I) a polyether polymer having at least one crosslinkable functional group and (II) a vinyl polymer which is compatible with said polyether polymer, is a product of living radical polymerization and has at least one crosslinkable functional group at a polymer terminus.

Further, the present invention provides a curable composition which comprises the following three components:

(I) a polyether polymer having at least one crosslinkable functional group, (II) a vinyl polymer incompatible with said polyether polymer and having at least one crosslinkable function group, and (III) a compatibilizing agent produced by copolymerization of a plurality of vinyl monomers and capable of compatibilizing said polyether polymer and said vinyl polymer with each other when added to a mixture thereof.

Furthermore, the present invention provides a curable composition which comprises the following three components:

(I) a polyether polymer having at least one crosslinkable functional group, (II) a vinyl polymer incompatible with said polyether polymer and having at least one crosslinkable function group, and (IV) at least one compatibilizing agent capable of compatibilizing said polyether polymer and said vinyl polymer with each other when added to a mixture thereof, said compatibilizing agent being selected from the group consisting of nonpolymer organic compounds, polymers obtainable by polymerizing a monomer or monomers other than vinyl monomers, and polymers obtainable by polymerizing a single vinyl monomer.

Further, the present invention provides a compatibilizing agent obtainable by copolymerization of a plurality of vinyl monomers and capable of compatibilizing the two components:

(I) a polyether polymer having at least one crosslinkable functional group, and (II) a vinyl polymer incompatible with said polyether polymer and having at least one crosslinkable function group, with each other, when added to a mixture thereof.

In the following, the present invention is described in detail.

DETAILED DISCLOSURE OF THE INVENTION

<<Re: Polyether polymer (I)>>

The component (I) in the present invention, namely the polyether polymer having at least one crosslinkable functional group may contain, or may not contain, a urethane bond or urea bond in the main chain thereof. The main chain of the polyether polymer is not particularly restricted but includes, among others, polyethylene oxide, polypropylene oxide, polybutylene oxide, and polyphenylene oxide. Among these, those which are essentially polyalkylene oxides are preferred, and the one which is essentially polypropylene oxide is more preferred. The latter may contain ethylene oxide, butylene oxide, phenylene oxide or the like, in addition to propylene oxide. The expression "the main chain is essentially polypropylene oxide" means that propylene oxide units account for at least 50%, preferably at least 70%, more preferably at least 90%, of all the main chain-constituting repeating units. The polypropylene oxide polymer preferably has a molecular weight distribution (Mw/Mn) of not more than 1.5, since a lower viscosity means better handleability.

The crosslinkable functional group in component (I) is not particularly restricted but includes, as preferred species, crosslinkable silyl groups, alkenyl groups, a hydroxyl group, an amino group, and groups having a polymerizable carbon-carbon double bond, and an epoxy group, among others. In particular, crosslinkable silyl groups are preferred. The definitions of these are the same as mentioned later herein. The crosslinkable functional group in component (I) maybe the same as or different from the crosslinkable functional group in component (II). From the curability viewpoint, however, it is preferred that both be not different in kind. Even when both are of the same kind, they may be the same or different in structure. The number of crosslinkable functional groups which the polyether polymer (I) has is at least 1 on average, but from the viewpoint of the curability of the composition, it is preferably more than 1, more preferably 1.1 to 4.0 on average, still more preferably 1.5 to 2.5 on average. From the viewpoint of the rubber elasticity of the cured product, the crosslinkable functional group is preferably located at a polyether polymer terminus, more preferably at each of the polymer termini.

The method of producing the component (I) polyether polymer is not particularly restricted but may be any of those known in the art.

In cases where the component (I) polyether polymer having at least one crosslinkable functional group, which is to be used in accordance with the present invention, contains a urethane or urea bond in the main chain thereof, any polyether polymer obtainable by any method of production may be used as the component (I) provided that it is an organic polymer containing one or more urethane or urea bonds within the molecule and having at least one crosslinkable functional group. The crosslinkable functional group is not particularly restricted but includes such various functional groups as mentioned above. Preferred among them are, however, silicon-containing groups represented by the formula (1):

$$-SiY_aR^1_{3-a} \qquad (1)$$

wherein, $R^1$ is an alkyl group containing 1 to 20 carbon atoms, an aryl group containing 6 to 20 carbon atoms, an aralkyl group containing 7 to 20 carbon atoms or a triorganosiloxy group represented by $R'_3SiO-$ (in which R' is a univalent hydrocarbon group containing 1 to 20 carbon atoms and the three R' groups may be the same or different) and, when there are two or more $R^1$ groups, they may be the same or different; Y represents a hydroxyl group or a hydrolyzable group and, when there are two or more Y groups, they may be the same or different; a represents 0, 1, 2 or 3. Further, use may be made of polyether polymers produced by industrially easy and simple processes, for example the process comprising reacting the terminal hydroxyl groups of a hydroxyl group-terminated oxyalkylene polymer (D) with a polyisocyanate compound (E) in excess to give a polymer having an isocyanato group-terminated polyurethane main chain (F) and then reacting the isocyanato groups with the W group of a silicon compound (G) represented by the formula (2):

$$W-R^2-SiY_aR_{3-a} \qquad (2)$$

wherein $R^1$, Y and a are the same as defined above, $R^2$ is a substituted or unsubstituted bivalent organic group containing 1 to 20 carbon atoms and W is an active hydrogen atom-containing group selected from among hydroxyl, carboxyl, mercapto and amino (primary or secondary), or reacting the terminal hydroxyl group of (D) simultaneously with excess (E) and the W group of (G), or the process comprising reacting the hydroxyl group-terminated oxyalkylene polymer (D) with a hydrolyzable silyl group-containing isocyanate compound (H) represented by the formula (3):

$$O=C=N-R^2-SiY_aR^1_{3-a} \qquad (3)$$

wherein $R^1$, $R^2$, Y and a are the same as defined above.

The oxyalkylene polymer (D) may be any one produced by any process but preferably is one having at least 0.7 hydroxyl groups per molecular terminus on the average for all molecules. More specifically, mention may be made of conventional oxyalkylene polymers produced by using an alkali metal catalyst and oxyalkylene polymers produced by reacting such an initiator as a polyhydroxy compound having at least two hydroxyl groups with an alkylene oxide in the presence of a double metal cyanide complex (c) or cesium, among others.

Preferred among others is the use of a double metal cyanide complex (c) since oxyalkylene polymers (D) lower in degree of unsaturation, higher in molecular weight, narrower in Mw/Mn, lower in viscosity and higher in acid resistance and weatherability can be obtained as compared with the conventional oxyalkylene polymers produced by using an alkali metal catalyst.

Preferred as the double metal cyanide complex (C) are complexes whose main component is zinc hexacyanocobaltate, and ethers and/or alcohol complexes thereof are preferred. The composition thereof may be the one essentially described in Japanese Kokoku Publication Sho-46-27250. Preferred as the ether are tetrahydrofuran, glymes, diglymes and other glymes. Among them, tetrahydrofuran and glymes are preferred since oxyalkylene polymers (D) narrower in Mw/Mn and lower in degree of unsaturation can be obtained using them. Preferred as the alcohol is t-butanol, which is described in Japanese Kokai Publication Hei-04-145123, since oxyalkylene polymers (D) lower in degree of unsaturation can be obtained using the same.

For attaining a high molecular weight by the reaction with the polyisocyanate compound (E) and for increasing a high rate of silyl group introduction by the reaction with the hydrolyzable silyl group-containing isocyanate compound (H), the number of hydroxyl groups in the oxyalkylene polymer (D) is preferably not less than 1.6, more preferably 1.8 to 4, per molecule on the average for all molecules. Most preferably, it is 1.8 to 3 so that gelation may be avoided in the step of reaction with the polyisocyanate compound (E). Oxyalkylene polymers (D) having at least 2 hydroxyl groups can be produced by using a trifunctional or higher functionality initiator in lieu of a part or the whole of the bifunctional initiator. It is also possible to obtain an oxyalkylene polymer (D) having 1.8 to 3 hydroxyl groups per molecule on the average for all molecules by blending an oxyalkylene polymer which is at least bifunctional with an oxyalkylene polymer which is at most bifunctional.

As specific species, there may be mentioned polyoxyethylene compounds, polyoxypropylene compounds, polyoxybutylene compounds, polyoxyhexylene compounds, polyoxytetramethylene compounds and/or copolymers of these.

Polyoxypropylene diol, polyoxypropylene triol, polyoxypropylene tetraol, copolymers of these polymers with ethylene oxide and, further, mixtures thereof are particularly preferred as the oxyalkylene polymer (D).

Oxyalkylene polymers obtainable by copolymerizing ethylene oxide so that they may terminate at primary hydroxyl groups are preferred since their reaction with the polyisocyanate compound (E) or hydrolyzable silyl group-containing isocyanate compound (H) is facilitated.

The number average molecular weight of the oxyalkylene polymer (D) to be used maybe not less than 1,000 but preferably is not less than 4,000, since when it is less than 4,000, the number of urethane bonds introduced in the polyurethane main chain (F) becomes increased, so that the viscosity becomes relatively high.

The polyisocyanate compound (E) to be used in obtaining the polyurethane main chain (F) may be any polyisocyanate compound.

The number of isocyanato groups contained in the polyisocyanate compound (E) is preferably 2 to 5 per molecule on average and, from the ready availability viewpoint, it is more preferably 2 to 3. Most preferably, it is 2 since no gelation is caused on the occasion of reaction with the oxyalkylene polymer (D).

As specific examples, there may be mentioned tolylene diisocyanate (TDI), methylene diisocyanate (MDI), xylylene diisocyanate (XDI), isophoronediisocyanate (IPDI), hexamethylene diisocyanate (HMDI), tetramethylene diisocyanate (TMDI) and the like. Uretdione derivatives, isocyanurate derivavtives, cyanurate derivatives or carbodiimide derivatives of these may also be used.

As specific examples of the silicon compound (G) represented by the formula (2), which is to be used for introducing the silyl group represented by the formula (1) into the polyether polymer molecules, there may be mentioned amino-substituted alkoxysilanes such as γ-aminopropyltrimethoxysilane, γ-aminopropyltriethoxysilane, γ-aminopropylmethyldimethoxysilane, N-(β-aminoethyl)-γ-aminopropyltrimethoxysilane, N-(β-aminoethyl)-γ-aminopropyltriethoxysilane, N-(β-aminoethyl)-γ-aminopropylmethyldimethoxysialne and 1,3-diaminoisopropyltrimethoxysilane, γ-hydroxypropyltrimethoxysilane, γ-mercaptopropyltrimethoxysilane, and the like.

As specific examples of the silyl group-containing isocyanate compound (H) represented by the formula (3), which is to be used for introducing the silyl group represented by the formula (1) into the polyether polymer molecules, there may be mentioned γ-trimethoxysilylpropyl isocyanate, γ-trimethoxysilylpropyl isocyanate, γ-methyldimethoxysilylpropyl isocyanate, γ-methyldiethoxysilylpropyl isocyanate, and the like.

A catalyst may be used in the reaction of the hydroxyl groups of the oxyalkylene polymer (D) with the isocyanato group, and in the reaction of the W group of the silicon compound with the isocyanato group. In cases where the storage stability of the resulting polyether polymer is sacrificed, the reactions are preferably carried out in the absence of any catalyst. When a catalyst is used, any of the known catalysts catalyzing the reaction between a hydroxyl group and an isocyanato group may be used.

When, in the practice of the present invention, the polyether polymer having at least one crosslinkable functional group, which is the component (I), contains a urethane or urea bond(s) in the main chain thereof, the polyether polymer preferably has a number average molecular weight of not less than 7,500. The use of such an organic polymer having a number average molecular weight of 7,500 to 25,000 is more preferred. If the number average molecular weight of the polyether polymer is lower than 7,500, the cured products will become hard and low in elongation and, when the number average molecular weight exceeds 25,000, the adhesiveness of the polymer itself decreases markedly, rendering the polymer less practicable, although there is no problem about the flexibility or elongation of the cured products. From the viscosity viewpoint, a number average molecular weight of 8,000 to 20,000 is particularly preferred.

The mixing ration of the component (II) vinyl polymer to the component (I) polyether polymer is preferably within the range of 100/1 to 1/100, more preferably 100/5 to 5/100, still more preferably 100/10 to 10/100. When the blending proportion of the vinyl polymer (II) is smaller, the weatherability, one of the effects of the present invention, may hardly be expressed in certain instances.

<<Re: Vinyl Polymer (II)>>

<Main Chain>

The present inventors have so far made a number of inventions relating to various crosslinkable functional group-terminated vinyl polymers, methods of producing the same, curable compositions comprising the same and uses thereof (see, for example, Japanese Kokai Publication Hei-11-080249, Japanese Kokai Publication Hei-11-080250, Japanese Kokai Publication Hei-11-005815, Japanese Kokai Publication Hei-11-116617, Japanese Kokai Publication Hei-11-116606, Japanese Kokai Publication Hei-11-080571, Japanese Kokai Publication Hei-11-080570, Japanese Kokai Publication Hei-11-130931, Japanese Kokai Publication Hei-11-100433, Japanese Kokai Publication Hei-11-116763, Japanese Kokai Publication Hei-09-272714 and Japanese Kokai Publication Hei-09-272715). The vinyl polymer (II) to be used according to the present invention is not particularly restricted. Thus, all the polymers disclosed in the above-cited publications can appropriately be used. The term "compatible" as used herein refers to the condition that two or more polymers can be sufficiently mixed up and, after one week of standing at room temperature, the mixture will not show any boundary observable by the eye.

The vinyl monomer constituting the main chain of the vinyl polymer (II) according to the invention is not particularly restricted but includes various species. As examples, there may be mentioned (meth) acrylic monomers such as (meth) acrylic acid, methyl (meth)acrylate, ethyl (meth) acrylate, n-propyl (meth)acrylate, isopropyl (meth)acrylate, n-butyl (meth)acrylate, isobutyl (meth)acrylate, t-butyl (meth)acrylate, n-pentyl (meth)acrylate, n-hexyl (meth) acrylate, cyclohexyl (meth)acrylate, n-heptyl (meth) acrylate, n-octyl (meth)acrylate, 2-ethylhexyl (meth) acrylate, nonyl (meth)acrylate, decyl (meth)acrylate, dodecyl (meth)acrylate, myristyl (meth)acrylate, palmityl (meth)acrylate, stearyl (meth)acrylate, eicosyl (meth) acrylate, phenyl (meth)acrylate, toluyl (meth)acrylate, benzyl (meth)acrylate, 2-methoxyethyl (meth)acrylate, 3-methoxybutyl (meth) acrylate, 2-hydroxyethyl (meth) acrylate, 2-hydroxypropyl (meth)acrylate, glycidyl (meth) acrylate, 2-aminoethyl (meth)acrylate, γ-(methacryloyloxypropyl)trimethoxysilane, (meth)acrylic acid-ethylene oxide adducts, trifluoromethylmethyl (meth) acrylate, 2-trifluoromethylethyl (meth)acrylate, 2-perfluoroethylethyl (meth)acrylate, 2-perfluoroethyl-2-perfluorobutylethyl (meth)acrylate, 2-perfluoroethyl (meth) acrylate, perfluoromethyl (meth)acrylate, diperfluoromethylmethyl (meth)acrylate, 2-perfluoromethyl-2-perfluoroethylmethyl (meth)acrylate, 2-perfluorohexylethyl (meth)acrylate, 2-perfluorodecylethyl (meth)acrylate, and 2-perfluorohexadecylethyl (meth)acrylate; aromatic vinyl monomers such as styrene, vinyltoluene, α-methylstyrene, chlorostyrene, styrenesulfonic acid and salts thereof;

fluorine-containing vinyl monomers such as perfluoroethylene, perfluoropropylene, and vinylidene fluoride; silicon-containing vinyl monomers such as vinyltrimethoxysilane and vinyltriethoxysilane; maleic anhydride, maleic acid, and maleic acid monoalkyl esters and dialkyl esters; fumaric acid, and fumaric acid monoalkyl esters and dialkyl esters; maleimide monomers such as maleimide, methylmaleimide, ethylmaleimide, propylmaleimide, butylmaleimide, hexylmaleimide, octylmaleimide, dodecylmaleimide, stearylmaleimide, phenylmaleimide, and cyclohexylmaleimide; acrylonitrile monomers such as acrylonitrile and methacrylonitrile; amide group-containing vinyl monomers such as acrylamide and methacrylamide; vinyl esters such as vinyl acetate, vinyl propionate, vinyl pivalate, vinyl benzoate, and vinyl cinnamate; alkenes such as ethylene and propylene; conjugated dienes such as butadiene and isoprene; vinyl chloride, vinylidene chloride, allyl chloride, allyl alcohol, and the like. These may be used singly or a plurality of them may be subjected to copolymerization.

The main chain of the vinyl polymer (II) is preferably one produced by polymerizing mainly at least one monomer selected from the group consisting of (meth) acrylic monomers, acrylonitrile monomers, aromatic vinyl monomers, fluorine-containing vinyl monomers, and silicon-containing vinyl monomers. The term "mainly" as used herein means that the above-mentioned monomer accounts for at least 50 mole percent, preferably at least 70 mole percent, of the monomer units constituting the vinyl polymer.

From the viewpoint of physical properties of products, among others, aromatic vinyl monomers and (meth)acrylic monomers are preferred among others. Acrylic ester monomers and methacrylic ester monomers are more preferred, and acrylic ester monomers are particularly preferred. Butyl acrylate is still more preferred. In the practice of the present invention, these preferred monomers may be copolymerized or, further block-copolymerized with another monomer and, on that occasion, the content of these preferred monomers is preferably not less than 40% by weight. In such a sense, the vinyl polymer (II) is preferably a (meth)acrylic polymer, more preferably an acrylic polymer, still more preferably an acrylic ester polymer. In the above form of expression, "(meth) acrylic acid", for instance, means acrylic acid and/or methacrylic acid.

From the physical properties viewpoint, in particular, the vinyl polymer (II) preferably contains (meth)acrylic ester units (a) having, in the ester moiety, a group selected from the group consisting of alkyl groups containing 5 to 30 carbon atoms, aryl group containing 6 to 30 carbon atoms and aralkyl groups containing 7 to 30 carbon atoms. When the number of carbon atoms is 5 or less, the compatibility with the polyether polymer (I) can hardly be secured and, when it is greater than 30, the polymer becomes difficult to handle. More preferred as the ester moiety are alkyl, aryl or aralkyl groups containing 8 to 30 carbon atoms. Still more preferred as the ester moiety are alkyl, aryl or aralkyl groups containing 10 to 25 carbon atoms.

Especially preferred as the (meth)acrylic ester polymers are those resulting from copolymerization of two or more (meth)acrylic ester monomers differing in the number of carbon atoms in the ester moiety. More specifically, there may be mentioned copolymers derived from (a) a (meth) acrylic ester unit having, in their ester moiety, a group selected from the group consisting of the above-mentioned $C_{5-30}$ alkyl groups, $C_{6-30}$ aryl groups and $C_{7-30}$ aralkyl groups and (b) a (meth) acrylic ester unit having, in their ester moiety, an alkyl group containing 1 to 6 carbon atoms (the number of carbon atoms in the ester moiety in unit (a) being larger than the number of carbon atoms in the ester moiety in unit (b)) The mole ratio between both units is not particularly restricted but may be adjusted in various ways according to the physical properties desired of the curable composition or cured products. Generally, however, the ratio is generally 1:100 to 100:1, preferably 1:50 to 10:1, more preferably 1:20 to 1:1.

The molecular weight distribution, namely the ratio (Mw/Mn) between the weight average molecular weight (MW) and number average molecular weight (Mn) as determined by gel permeation chromatography, of the vinyl polymer (II) according to the invention is not particularly restricted but preferably is less than 1.8, preferably not more than 1.7, more preferably not more than 1.6, still more preferably not more than 1.5, especially preferably not more than 1.4, most preferably not more than 1.3. In the practice of the present invention, the GPC measurement is generally carried out on a polystyrene gel column using chloroform as a mobile phase, and the number average molecular weight can be determined on the polystyrene equivalent basis.

The number average molecular weight of the vinyl polymer (II) according to the invention is not particularly restricted but preferably is not less than 3, 000, more preferably not less than 5,000, still more preferably not less than 10,000, as determined by gel permeation chromatography. When the molecular weight is lower, the high elongation required of the cured products may not be attained in certain instances. Further, it is preferably not more than 1,000,000, more preferably not more than 100,000, still more preferably not more than 50,000, as determined by the same method.

<Method of Main Chain Synthesis>

Although the method of synthesizing the vinyl polymer (II), according to the invention is not restricted, controlled radical polymerization is preferred, living radical polymerization is more preferred, and atom transfer radical polymerization is particularly preferred. These are explained in the following.

Controlled Radical Polymerization

Radical polymerization methods can be classified into "ordinary radical polymerization methods" which comprise merely copolymerizing a monomer having a specific functional group and a vinyl monomer(s) using an azo compound, a peroxide or the like as a polymerization initiator, and "controlled radical polymerization methods" by which a specific functional group can be introduced into a controlled site(s), for example a terminus or termini.

"Ordinary radical polymerization methods" are simple and easy to perform but allow the specific functional group-containing monomer to be introduced into the polymer only at random. For obtaining polymers with a high percentage of functionalization, it is necessary to use this monomer in fairly large amounts. When, conversely, only a small amount of the monomer is used, the problem arises that the proportion of polymer molecules formed without introduction of this specific functional group increases. Further, since they consist in free radical polymerization, there is another problem, namely only polymers with a wide molecular weight distribution and a high viscosity can be obtained.

"Controlled radical polymerization methods" can be further classified into "chain transfer agent methods" which comprise carrying out polymerization using a chain transfer agent having a specific functional group(s) to give functional group-terminated vinyl polymers and "living radical polymerization methods" by which growing polymer termini can grow, without undergoing termination and like reactions, to give polymers with a molecular weight approximately as designed.

"Chain transfer agent methods" can give polymers with a high level of functionalization but require the use of a fairly large amount of a chain transfer agent having a specific functional group(s) relative to the initiator, hence have economical problems, inclusive of treatment-related problems. Like the above-mentioned "ordinary radical polymerization methods", there is also the problem that only polymers having a wide molecular weight distribution and a high viscosity can be obtained because of their consisting in free radical polymerization.

Unlike these polymerization methods, "living radical polymerization methods" hardly undergo termination reactions and can give polymers with a narrow molecular weight distribution (Mw/Mn being about 1.1 to 1.5) and make it possible to arbitrarily control the molecular weight by changing the monomer-to-initiator charge ratio, in spite of their belonging to the class of radical polymerization methods regarded as being difficult to control because of high rates of polymerization and a tendency toward ready occurrence of termination reactions, such as radical-to-radical coupling.

Therefore, such "living radical polymerization methods" are more preferred as the methods of producing the specific functional group-containing vinyl polymers mentioned above, since they can give polymers narrow in molecular weight distribution and low in viscosity and, in addition, make it possible to introduce specific functional group-containing monomers into the polymers at almost arbitrary positions.

The term "living polymerization", in its narrow sense, means a mode of polymerization in which molecular chains grow while their terminus or termini always retain activity. In the ordinary sense, however, the term also includes the mode of pseudo-living polymerization in which molecular chains grow while terminally inactivated ones and terminally activated ones are in equilibrium. The latter definition applies also in the present invention.

In recent years, "living radical polymerization methods" have actively been studied by a number of groups of researchers. For example, there may be mentioned the one using a cobalt porphyrin complex, as described in the Journal of the American Chemical Society (J. Am. Chem. Soc.), 1994, vol. 116, page 7943, the one using a radical capping agent, such as a nitroxide compound, as described in Macromolecules, 1994, vol. 27, page 7228, and "atom transfer radical polymerization" (ATRP) using an organic halide or the like as an initiator and a transition metal complex as a catalyst.

Among the "living radical polymerization methods", the "atom transfer radical polymerization method", by which vinyl monomers are polymerized using an organic halide or halogenated sulfonyl compound, for instance, as an initiator and a transition metal complex as a catalyst, is more preferred for the production of specific functional group-containing vinyl polymers, for this method not only has the characteristic features of "living radical polymerization" but also gives polymers having a terminal halogen atom(s) relatively convenient for functional group conversion reactions and, further, the degree of freedom is large in initiator and catalyst designing. As examples of this atom transfer radical polymerization, there may be mentioned those described in Matyjaszewski et al.: J. Am. Chem. Soc., 1995, vol. 117, page 5614, Macromolecules, 1995, vol. 28, page 7901, Science, 1996, vol. 272, page 866, WO 96/30421, WO 97/18247, WO 98/01480, WO 98/40415 and Sawamoto et al.: Macromolecules, 1995, vol. 28, page 1721, Japanese Kokai Publication Hei-09-208616 and Japanese Kokai Publication Hei-08-41117, among others.

Which of such living radical polymerization methods is to be used is not critical in the practice of the present invention. Preferred, however, is the atom transfer radical polymerization.

In the following, this living radical polymerization is described in detail. Prior thereto, one mode of controlled radical polymerization, namely polymerization using a chain transfer agent, which can be used in producing the polymer (II) to be described later herein, is first described. The radical polymerization using a chain transfer agent (telomer) is not particularly restricted but includes, for example, the following two methods for producing vinyl polymers having a terminal structure(s) suited for utilization in the practice of the present invention.

One method is to produce halogen-terminated polymers by using a halogenated hydrocarbon as a chain transfer agent, as described in Japanese Kokai Publication Hei-04-132706, and the other is to produce hydroxyl-terminated polymers using a hydroxyl-containing mercaptan or a hydroxyl-containing polysulfide or the like as a chain transfer agent, as described in Japanese Kokai Publication Sho-61-271306, Japanese Patent No.2594402 or Japanese Kokai Publication Sho-54-47782.

The living radical polymerization is now described.

First, the technique which uses a radical capping agent such as a nitroxide compound is described. In this polymerization, a nitroxy free radical (=N—O.), which is generally stable, is used as a radical capping agent. Such compound includes, as preferred species, but is not limited to, 2,2,6,6-tetrasubstituted-1-piperidinyloxy radicals, 2,2,5,5-tetrasubstituted-1-pyrrolidinyloxy radicals and like cyclic hydroxyamine-derived nitroxy free radicals. Suitable as the substituent are alkyl groups containing not more than 4 carbon atoms, such as methyl or ethyl. Specific nitroxy free radical compounds include, but are not limited to, 2,2,6,6-tetramethyl-1-piperidinyloxy radical (TEMPO), 2,2,6,6-tetraethyl-1-piperidinyloxy radical, 2,2,6,6-tetramethyl-4-oxo-1-piperidinyloxy radical, 2,2,5,5-tetramethyl-1-pyrrolidinyloxy radical, 1,1,3,3-tetramethyl-2-isoindolinyloxy radical and N,N-di-t-butylamine-oxy radical. It is also possible to use other stable free radicals, such as galvinoxyl free radical, in lieu of nitroxy free radicals.

The above radical capping agent is used in combination with a radical former or generator. Presumably, a reaction product formed from the radical capping agent and radical generator serves as a polymerization initiator to allow the polymerization of an addition-polymerizable monomer(s) to proceed. Although the ratio between both is not particularly restricted, the radical initiator is used appropriately in an amount of 0.1 to 10 moles per mole of the radical capping agent.

While various compounds can be used as the radical generator, a peroxide capable of generating a radical under polymerization temperature conditions is preferred. Such peroxide includes, but is not limited to, diacyl peroxides such as benzoyl peroxide and lauroyl peroxide, dialkyl peroxides such as dicumyl peroxide and di-t-butyl peroxide, peroxycarbonates such as diisopropyl peroxydicarbonate and bis(4-t-butylcyclohexyl) peroxydicarbonate, and alkyl peresters such as t-butyl peroxyoctoate and t-butyl peroxybenzoate. In particular, benzoyl peroxide is preferred. Further, other radical generators, for example radical-generating azo compounds such as azobisisobutyronitrile can be used in lieu of peroxides.

Alkoxyamine compounds such as those illustrated below may be used as initiators in lieu of the combined use of a radical capping agent and a radical generator, as reported in Macromolecules, 1995, vol. 28, page 2993.

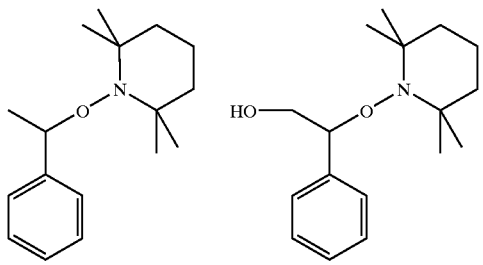

When an alkoxyamine compound is used as an initiator and that compound is, one having a functional group, such as a hydroxyl group, such as the one illustrated above, functional group-terminated polymers are obtained. When this is utilized in the practice of the present invention, functional group-terminated polymers can be obtained.

The polymerization conditions, including monomer(s), solvent and polymerization temperature, to be used in the above-mentioned polymerization using a radical capping agent such as a nitroxide compound are not particularly restricted but may be the same as those used in the atom transfer radical polymerization mentioned below.

Atom Transfer Radical Polymerization

Now, the atom transfer radical polymerization method, which is more preferred as the living radical polymerization in carrying out the present invention, is described.

In this atom transfer radical polymerization, an organic halide, in particular a highly reactive carbon-halogen bond-containing organic halide (e.g. a carbonyl compound having a halogen at an α-position or a compound having a halogen at a benzyl position), a halogenated sulfonyl compound or the like is used as an initiator.

Specific examples are as follows:

$C_6H_5$—$CH_2X$, $C_6H_5$—$C(H)(X)CH_3$, $C_6H_5$—$C(X)(CH_3)_2$ (in the above chemical formulas, $C_6H_5$ is a phenyl group and X is a chlorine, bromine or iodine atom);

$R^3$—$C(H)(X)$—$CO_2R^4$, $R^3$—$C(CH_3)(X)$—$CO_2R^4$, $R^3$—$C(H)(X)$—$C(O)R^4$, $R^3$—$C(CH_3)(X)$—$C(O)R^4$ (in the above formulas, $R^3$ and $R^4$ each is a hydrogen atom or an alkyl, aryl or aralkyl group containing 1 to 20 carbon atoms and X is a chlorine, bromine or iodine atom);

$R^3$—$C_6H_4$—$SO_2X$ (in the above formula, $R^3$ is a hydrogen atom or an alkyl, aryl or aralkyl group containing 1 to 20 carbon atoms and X is a chlorine, bromine or iodine atom); and the like.

An organic halide or halogenated sulfonyl compound having a further functional group in addition to the functional group for initiating the polymerization may also be used as the initiator in atom transfer radical polymerization. In such case, vinyl polymers having the further functional group at one main chain terminus and the structure of the growing terminus in atom transfer radical polymerization at the other main chain terminus are produced. As such further functional group, there maybe mentioned alkenyl, crosslinkable silyl, hydroxyl, epoxy, amino and amide groups, among others.

The alkenyl group-containing organic halide is not particularly restricted but includes, among others, those having a structure represented by the general formula 4:

$$R^6R^7C(X)—R^8—R^9—C(R^5)=CH_2 \qquad (4)$$

wherein $R^5$ is a hydrogen atom or a methyl group, $R^6$ and $R^7$ each is a hydrogen atom or a univalent alkyl, aryl or aralkyl group containing 1 to 20 carbon atoms and such $R^6$ and $R^7$ groups may be bonded together at the respective other ends, $R^8$ is —C(O)O— (ester group), —C(O)— (keto group) or an o-, m- or p-phenylene group, $R^9$ is a direct bond or a bivalent organic group containing 1 to 20 carbon atoms, which may contain one or more ether bonds, and X is a chlorine, bromine or iodine atom.

As specific examples of the substituent $R^6$ and $R^7$, there may be mentioned a hydrogen atom, and methyl, ethyl, n-propyl, isopropyl, butyl, pentyl, hexyl and like groups. $R^6$ and $R^7$ may be connected to each other at the respective other ends to form a cyclic skeleton.

As specific examples of the alkenyl-containing organic halide represented by the general formula 4, there may be mentioned the following:

$XCH_2C(O)O(CH_2)_nCH=CH_2$, $H_3CC(H)(X)C(O)O(CH_2)_nCH=CH_2$, $(H_3C)_2C(X)C(O)O(CH_2)_nCH=CH_2$, $CH_3CH_2C(H)(X)C(O)O(CH_2)_nCH=CH_2$,

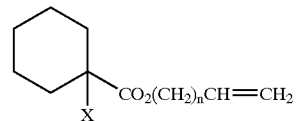

(in the above formulas, X is a chlorine, bromine or iodine atom and n is an integer of 0 to 20);

$XCH_2C(O)O(CH_2)_nO(CH_2)_mCH=CH_2$, $H_3CC(H)(X)C(O)O(CH_2)_nO(CH_2)_mCH=CH_2$, $(H_3C)_2C(X)C(O)O(CH_2)_nO(CH_2)_mCH=CH_2$, $CH_3CH_2C(H)(X)C(O)O(CH_2)_nO(CH_2)_mCH=CH_2$,

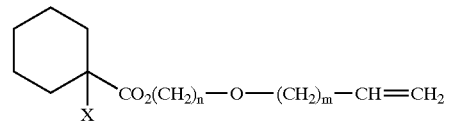

(in the above formulas, X is a chlorine, bromine or iodine atom, n is an integer of 1 to 20 and m is an integer of 0 to 20);

o-, m-, p-$XCH_2$—$C_6H_4$—$(CH_2)_n$—$CH=CH_2$, o-, m-, p-$CH_3C(H)(X)$—$C_6H_4$—$(CH_2)_n$—$CH=CH_2$, o-, m-, p-$CH_3CH_2C(H)(X)$—$C_6H_4$—$(CH_2)_n$—$CH=CH_2$ (in the above formulas, X is a chlorine, bromine or iodine atom and n is an integer of 0 to 20);

o-, m-, p-$XCH_2$—$C_6H_4$—$(CH_2)_n$—$O$—$(CH_2)_m$—$CH=CH_2$, o-, m-, p-$CH_3C(H)(X)$—$C_6H_4$—$(CH_2)_n$—$O$—$(CH_2)_m$—$CH=CH_2$, o-, m-, p-$CH_3CH_2C(H)(X)$—$C_6H_4$—$(CH_2)_n$—$O$—$(CH_2)_m$—$CH=CH_2$ (in the above formulas, X is a chlorine, bromine or iodine atom, n is an integer of 1 to 20 and m is an integer of 0 to 20);

o-, m-, p-XCH$_2$—C$_6$H$_4$—O—(CH$_2$)$_n$—CH=CH$_2$, o-, m-, p-CH$_3$C(H)(X)—C$_6$H$_4$—O—(CH$_2$)$_n$—CH=CH$_2$, o-, m-, p-CH$_3$CH$_2$C(H)(X)—C$_6$H$_4$—O—(CH$_2$)$_n$—CH=CH$_2$ (in the above formulas, X is a chlorine, bromine or iodine atom and n is an integer of 0 to 20); and o-, m-, p-XCH$_2$—C$_6$H$_4$—O—(CH$_2$)$_n$—O—(CH$_2$)$_m$—CH=CH$_2$, o-, m-, p-CH$_3$C(H)(X)—C$_6$H$_4$—O—(CH$_2$)$_n$—(CH$_2$)—CH=CH$_2$, o-, m-, p-CH$_3$CH$_2$C(H)(X)—C$_6$H$_4$—O—(CH$_2$)$_n$—O—(CH$_2$)$_m$—CH$_2$ (in the above formulas, X is a chlorine, bromine or iodine atom, n is an integer of 1 to 20 and m is an integer of 0 to 20).

As the alkenyl-containing organic halide, there may further be mentioned compounds represented by the general formula 5:

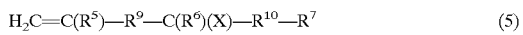

$$H_2C=C(R^5)-R^9-C(R^6)(X)-R^{10}-R^7 \quad (5)$$

(wherein R$^5$, R$^6$, R$^7$, R$^9$ and X are the same as defined above and R$^{10}$ represents a direct bond, —C(O)O— (ester group), —C(O)— (keto group) or an o-, m- or p-phenylene group).

R$^8$ is a direct bond or a divalent organic group (which may contain one or more ether bonds) containing 1 to 20 carbon atoms. When it is a direct bond, a vinyl group is bound to the carbon atom to which a halogen is bound, whereby an allyl halide compound is formed. In this case, the carbon-halogen bond is activated by the neighboring vinyl group, so that R$^{10}$ is not always required to be a C(O)O or phenylene group, for instance, but may be a direct bond. When R$^9$ is other than a direct bond, R$^{10}$ should preferably be a C(O)O, C(O) or phenylene group so that the carbon-halogen bond may be activated.

Specific examples of the compound of general formula 5 are as follows:

CH$_2$=CHCH$_2$X, CH$_2$=C(CH$_3$)CH$_2$X, CH$_2$=CHC(H)(X)CH$_3$, CH$_2$=C(CH$_3$)C(H)(X)CH$_3$, CH$_2$=CHC(X)(CH$_3$)$_2$, CH$_2$=CHC(H)(X)C$_2$H$_5$, CH$_2$=CHC(H)(X)CH(CH$_3$)$_2$, CH$_2$=CHC(H)(X)C$_6$H$_5$, CH$_2$=CHC(H)(X)CH$_2$C$_6$H$_5$, CH$_2$=CHCH$_2$C(H)(X)—CO$_2$R, CH$_2$=CH(CH$_2$)$_2$C(H)(X)—CO$_2$R, CH$_2$=CH(CH$_2$)$_3$C(H)(X)—CO$_2$R, CH$_2$=CH(CH$_2$)$_8$C(H)(X)—CO$_2$R, CH$_2$=CHCH$_2$C(H)(X)—C$_6$H$_5$, CH$_2$=CH(CH$_2$)$_2$C(H)(X)—C$_6$H$_5$, CH$_2$=CH(CH$_2$)$_3$C(H)(X)—C$_6$H$_5$ (in the above formulas, X is a chlorine, bromine or iodine atom and R is an alkyl, aryl or aralkyl group containing 1 to 20 carbon atoms), etc.

The following may be mentioned as specific examples of the alkenyl-containing halogenated sulfonyl compound:

o-, m-, p-CH$_2$=CH—(CH$_2$)$_n$—C$_6$H$_4$—SO$_2$X, o-, m-, p-CH$_2$=CH—(CH$_2$)$_n$—O—C$_6$H$_4$—SO$_2$X (in the above formulas, X is a chlorine, bromine or iodine atom and n is an integer of 0 to 20); etc.

The above-mentioned crosslinkable silyl-containing organic halide is not particularly restricted but includes, among others, compounds having a structure represented by the general formula 6:

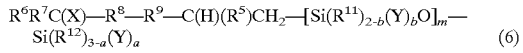

$$R^6R^7C(X)-R^8-R^9-C(H)(R^5)CH_2-[Si(R^{11})_{2-b}(Y)_bO]_m-Si(R^{12})_{3-a}(Y)_a \quad (6)$$

(wherein R$^5$, R$^6$, R$^7$, R$^8$, R$^9$ and X are the same as defined above, R$^{11}$ and R$^{12}$ each represents an alkyl, aryl or aralkyl group containing 1 to 20 carbon atoms or a triorganosiloxy group represented by (R')$_3$SiO— (in which R' is a univalent hydrocarbon group containing 1 to 20 carbon atoms and the three R' groups may be the same or different) and, when there are two or more R$^{11}$ or R$^{12}$ groups, they may be the same or different; Y represents a hydroxyl group or a hydrolyzable group and, when there are two or more Y groups, they may be the same or different; a represents 0, 1, 2 or 3, b represents 0, 1 or 2, and m is an integer of 0 to 19 provided that the relation a+mb≧1 is satisfied).

Specific examples of the compound of general formula 6 are as follows:

XCH$_2$C(O)O(CH$_2$)$_n$Si(OCH$_3$)$_3$, CH$_3$C(H)(X)C(O)O(CH$_2$)$_n$Si(OCH$_3$)$_3$, (H$_3$C)$_2$C(X)C(O)O(CH$_2$)$_n$Si(OCH$_3$)$_3$, XCH$_2$C(O)O(CH$_2$)$_n$Si(CH$_3$)(OCH$_3$)$_2$, CH$_3$C(H)(X)C(O)O(CH$_2$)$_n$Si(CH$_3$)(OCH$_3$)$_2$, (H$_3$C)$_2$C(X)C(O)O(CH$_2$)$_n$Si(CH$_3$)(OCH$_3$)$_2$ (in the above formulas, X is a chlorine, bromine or iodine atom and n is an integer of 0 to 20);

XCH$_2$C(O)O(CH$_2$)$_n$O(CH$_2$)$_m$Si(OCH$_3$)$_3$, H$_3$CC(H)(X)C(O)O(CH$_2$)$_n$O(CH$_2$)$_m$Si(OCH$_3$)$_3$, (H$_3$C)$_2$C(X)C(O)O(CH$_2$)$_n$O(CH$_2$)$_m$Si(OCH$_3$)$_3$, CH$_3$CH$_2$C(H)(X)C(O)O(CH$_2$)$_n$O(CH$_2$)$_m$Si(OCH$_3$)$_3$, XCH$_2$C(O)O(CH$_2$)$_n$O(CH$_2$)$_m$Si(CH$_3$)(OCH$_3$)$_2$, H$_3$CC(H)(X)C(O)O(CH$_2$)$_n$O(CH$_2$)$_m$Si(CH$_3$)(OCH$_3$)$_2$, (H$_3$C)$_2$C(X)C(O)O(CH$_2$)$_n$O(CH$_2$)$_m$Si(CH$_3$)(OCH$_3$)$_2$, CH$_3$CH$_2$C(H)(X)C(O)O(CH$_2$)$_n$O(CH$_2$)$_m$Si(CH$_3$)(OCH$_3$)$_2$ (in the above formulas, X is a chlorine, bromine or iodine atom, n is an integer of 1 to 20 and m is an integer of 0 to 20);

o-, m-, p-XCH$_2$—C$_6$H$_4$—(CH$_2$)$_2$Si(OCH$_3$)$_3$, o-, m-, p-CH$_3$C(H)(X)—C$_6$H$_4$—(CH$_2$)$_2$Si(OCH$_3$)$_3$, o-, m-, p-CH$_3$CH$_2$C(H)(X)—C$_6$H$_4$—(CH$_2$)$_2$Si(OCH$_3$)$_3$, o-, m-, p-XCH$_2$—C$_6$H$_4$—(CH$_2$)$_3$Si(OCH$_3$)$_3$, o-, m-, p-CH$_3$C(H)(X)—C$_6$H$_4$—(CH$_2$)$_3$Si(OCH$_3$)$_3$, o-, m-, p-CH$_3$CH$_2$C(H)(X)—C$_6$H$_4$—(CH$_2$)$_3$Si(OCH$_3$)$_3$, o-, m-, p-XCH$_2$—C$_6$H$_4$—(CH$_2$)$_2$—O—(CH$_2$)$_3$Si(OCH$_3$)$_3$, o-, m-, p-CH$_3$C(H)(X)—C$_6$H$_4$—(CH$_2$)$_2$—O—(CH$_2$)$_3$Si(OCH$_3$)$_3$Si(OCH$_3$)$_3$, o-, m-, p-CH$_3$CH$_2$C(H)(X)—C$_6$H$_4$—(CH$_2$)$_2$—O—(CH$_2$)$_3$Si(OCH$_3$, o-, m-, p-XCH$_2$—C$_6$H$_4$—O—(CH$_2$)$_3$Si(OCH$_3$)$_3$, o-, m-, p-CH$_3$C(H)(X)—C$_6$H$_4$—O—(CH$_2$)$_3$Si(OCH$_3$)$_3$, o-, m-, p-CH$_3$CH$_2$C(H)(X)—C$_6$H$_4$—O—(CH$_2$)$_3$—Si(OCH$_3$)$_3$, o-, m-, p-XCH$_2$—C$_6$H$_4$—O—(CH$_2$)$_2$—O—(CH$_2$)$_3$—Si(OCH$_3$)$_3$, o-, m-, p-CH$_3$C(H)(X)—C$_6$H$_4$—O—(CH$_2$)$_2$—O—(CH$_2$)$_3$Si(OCH$_3$)$_3$, o-, m-, p-CH$_3$CH$_2$C(H)(X)—C$_6$H$_4$—O—(CH$_2$)$_2$—O—(CH$_2$)$_3$Si (OCH$_3$)$_3$ (in the above formulas, X is a chlorine, bromine or iodine atom); etc.

As further examples of the above-mentioned crosslinkable silyl-containing organic halide, there may be mentioned compounds having a structure represented by the general formula 7:

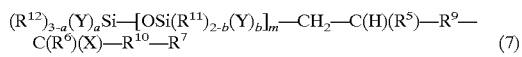

$$(R^{12})_{3-a}(Y)_aSi-[OSi(R^{11})_{2-b}(Y)_b]_m-CH_2-C(H)(R^5)-R^9-C(R^6)(X)-R^{10}-R^7 \quad (7)$$

wherein R$^5$, R$^6$, R$^7$, R$^9$, R$^{10}$, R$^{11}$, R$^{12}$, a, b, m, X and Y are the same as defined above.

Specific examples of such compound are as follows:

(CH$_3$O)$_3$SiCH$_2$CH$_2$C(H)(X)C$_6$H$_5$, (CH$_3$O)$_2$(CH$_3$)SiCH$_2$CH$_2$C(H)(X)C$_6$H$_5$, (CH$_3$O)$_3$Si(CH$_2$)$_2$C(H)(X)—

CO₂R, (CH₃O)₂(CH₃)Si(CH₂)₂C(H)(X)—CO₂R, (CH₃O)₃Si(CH₂)₃C(H)(X)—CO₂R, (CH₃O)₂(CH₃)Si(CH₂)₃C(H)(X)—CO₂R, (CH₃O)₃Si(CH₂)₄C(H)(X)—CO₂R, (CH₃O)₂(CH₃)Si(CH₂)₄C(H)(X)—CO₂R, (CH₃O)₃Si(CH₂)₉C(H)(X)—CO₂R, (CH₃O)₂(CH₃)Si(CH₂)₉C(H)(X)—CO₂R, (CH₃O)₃Si(CH₂)₃C(H)(X)—C₆H₅, (CH₃O)₂(CH₃)Si(CH₂)₃C(H)(X)—C₆H₅, (CH₃O)₃Si(CH₂)₄C(H)(X)—C₆H₅, (CH₃O)₂(CH₃)Si(CH₂)₄C(H)(X)—C₆H₅

(in the above formulas, X is a chlorine, bromine or iodine atom and R is an alkyl, aryl or aralkyl group containing 1 to 20 carbon atoms); etc.

The above-mentioned hydroxyl-containing organic halide or halogenated sulfonyl compound is not particularly restricted but includes, for example, the following:

HO—(CH₂)—OC(O)C(H)(R)(X)

wherein X is a chlorine, bromine or iodine atom, R is a hydrogen atom or an alkyl, aryl or aralkyl group containing 1 to 20 carbon atoms and n is an integer of 1 to 20.

The above-mentioned amino-containing organic halide or halogenated sulfonyl compound is not particularly restricted but includes, for example, the following:

H₂N—(CH₂)ₙ—OC(O)C(H)(R)(X)

wherein X is a chlorine, bromine or iodine atom, R is a hydrogen atom or an alkyl, aryl or aralkyl group containing 1 to 20 carbon atoms and n is an integer of 1 to 20.

The above-mentioned epoxy-containing organic halide or halogenated sulfonyl compound is not particularly restricted but includes, for example, the following:

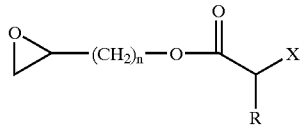

(wherein X is a chlorine, bromine or iodine atom, R is a hydrogen atom or an alkyl, aryl or aralkyl group containing 1 to 20 carbon atoms and n is an integer of 1 to 20).

For obtaining polymers having two or more growing terminal structures specified by the present invention in each molecule, an organic halide or halogenated sulfonyl compound having two or more initiation sites is preferably used as the initiator. As specific examples, there may be mentioned the following:

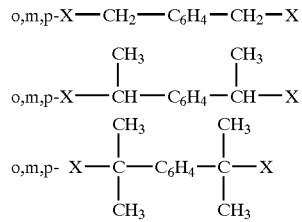

(in the above formulas, C₆H₄ is a phenylene group and X is a chlorine, bromine or iodine atom);

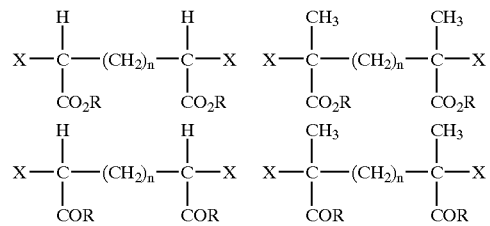

(in the above formulas, R is an alkyl, aryl or aralkyl group containing 1 to 20 carbon atoms, n is an integer of 0 to 20 and X is a chlorine, bromine or iodine atom);

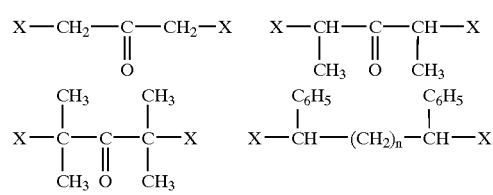

(in the above formulas, X is a chlorine, bromine or iodine atom and n is an integer of 0 to 20);

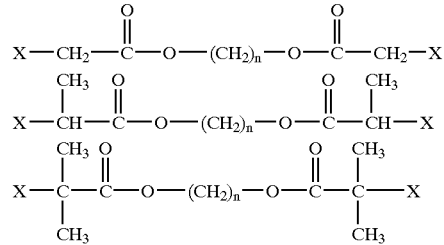

(in the above formulas, n is an integer of 1 to 20 and X is a chlorine, bromine or iodine atom);

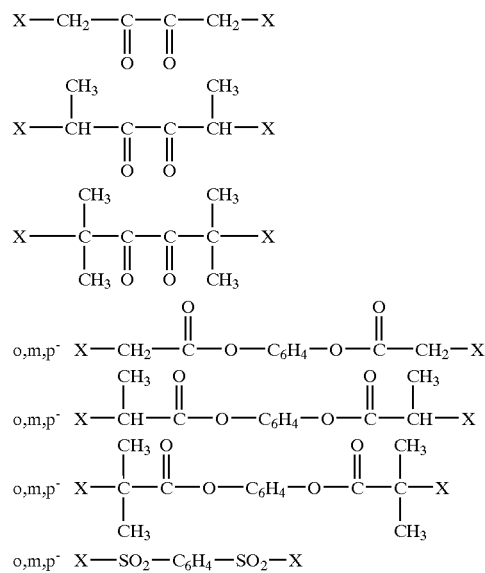

(in the above formulas, X is a chlorine, bromine or iodine atom); etc.

The vinyl monomers to be used in this polymerization are not particularly restricted but all those monomers mentioned hereinabove as examples can appropriately be used.

The transition metal complex to be used as the catalyst is not particularly restricted but preferably is a metal complex containing, as the central atom, an element of the group 7, 8, 9, 10 or 11 of the periodic table. More preferred are complexes of zero-valent copper, univalent copper, bivalent ruthenium, bivalent iron or bivalent nickel. Copper complexes are preferred among others. Specific examples of the univalent copper compound are cuprous chloride, cuprous bromide, cuprous iodide, cuprous cyanide, cuprous oxide and cuprous perchlorate. When such a copper compound is used, a ligand such as 2,2'-bipyridyl or a derivative thereof, 1, 10-phenanthroline or a derivative thereof or a polyamine such as tetramethylethylenediamine, pentamethyldiethylenetriamine or hexamethyltris (2-aminoethyl) amine is added for increasing the catalytic activity. Preferred ligands are nitrogen-containing compounds, more preferred ligands are chelate type nitrogen-containing compound, and still more preferred ligands are N,N,N',N'',N''-pentamethyldiethylenetriamine. The tristriphenylphosphine complex of divalent ruthenium chloride ($RuCl_2(PPh_3)_3$) is also suited for use as the catalyst. When such a ruthenium compound is used as the catalyst, an aluminum alkoxide is added as an activator. Furthermore, the divalent iron-bistriphenylphosphine complex ($FeCl_2(PPh_3)_2$), the divalent nickel-bistriphenylphosphine complex ($NiCl_2(PPh_3)_2$), and the divalent nickel-bistributylphosphine complex ($NiBr_2(PBu_3)_2$) are also suited for use as the catalyst.

The polymerization can be carried out without using any solvent or in the presence of various solvents. As the solvent species, there may be mentioned hydrocarbon solvents such as benzene and toluene, ether solvents such as diethyl ether and tetrahydrofuran, halogenated hydrocarbon solvents such as methylene chloride and chloroform, ketone solvents such as acetone, methyl ethyl ketone and methyl isobutyl ketone, alcohol solvents such as methanol, ethanol, propanol, isopropanol, n-butyl alcohol and tert-butyl alcohol, nitrile solvents such as acetonitrile, propionitrile and benzonitrile, ester solvents such as ethyl acetate and butyl acetate, carbonate solvents such as ethylene carbonate and propylene carbonate, and the like. These may be used singly or two or more of them may be used in admixture.

The polymerization can be carried out within the temperature range of 0° C. to 200° C., preferably 50 to 150° C., although the temperature range is not limited to such range.

In the practice of the present invention, the atom transfer radical polymerization also includes the so-called reverse atom transfer radical polymerization. The reverse atom transfer radical polymerization is a method comprising reacting an ordinary atom transfer radical polymerization catalyst in its high oxidation state resulting from radical generation, for example Cu(II) when Cu(I) is used as the catalyst, with an ordinary radical initiator, such as a peroxide, to thereby bring about an equilibrium state like in atom transfer radical polymerization (cf. Macromolecules, 1999, 32, 2872).

<Functional Groups>

The crosslinkable functional group in the vinyl polymer (II) is not restricted. Preferred as such are, however, crosslinkable silyl groups, alkenyl groups, a hydroxyl group, an amino group, polymerizable carbon-carbon double bond-containing groups, epoxy groups and like groups.

These crosslinkable functional groups all can be used so as to adapt to or answer the intended use/purpose.

Positions of Crosslinkable Functional Groups

When the cured products derived from the curable composition of the present invention are required to have rubber-like properties, it is essential that at least one of the crosslinkable functional groups consist in at a molecular chain terminus in order that the molecular weight between crosslinking sites, which greatly influences on the rubber elasticity, may be designed to be high. More preferably, all crosslinkable functional groups should be located at molecular chain termini.

Methods of producing such vinyl polymers, in particular (meth)acrylic polymers, having at least one crosslinkable functional group are disclosed in Japanese Kokoku Publication Hei-03-14068, Japanese Kokoku Publication Hei-04-55444 and Japanese Kokai Publication Hei-06-211922, among others. However, these methods consist in the above-mentioned free radical polymerization using a "chain transfer agent", so that the polymers obtained generally have a value of molecular weight distribution represented by Mw/Mn as high as 2 or more, hence have a problem in that their viscosity becomes high, although they have a crosslinkable functional group or groups at a molecular terminus or termini with a relatively high percentage. Therefore, for obtaining a vinyl polymer narrow in molecular weight distribution, low in viscosity and high in percentage of crosslinkable functional groups at molecular chain termini, the use of the above-mentioned "living radical polymerization technique" is preferred.

Number of Crosslinkable Functional Groups

The vinyl polymer (II) has at least one crosslinkable function group on average. From the composition curability viewpoint, the number of such groups is preferably more than 1, more preferably 1.1 to 4.0 on average, still more preferably 1.5 to 2.5.

In the following, an explanation is made of these functional groups.

Crosslinkable Silyl Groups

As the crosslinkable silyl groups to be used in the practice of the present invention, there may be mentioned those groups represented by the general formula 8:

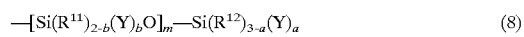

$$—[Si(R^{11})_{2-b}(Y)_bO]_m—Si(R^{12})_{3-a}(Y)_a \qquad (8)$$

wherein, $R^{11}$ and $R^{12}$ each is an alkyl group containing 1 to 20 carbon atoms, an aryl group containing 6 to 20 carbon atoms, an aralkyl group containing 7 to 20 carbon atoms or a triorganosiloxy group represented by $(R')_3SiO$—(in which R' is a univalent hydrocarbon group containing 1 to 20 carbon atoms and the three R' groups may be the same or different) and, when there are two or more $R^{11}$ or $R^{12}$ groups, they may be the same or different; Y represents a hydroxyl group or a hydrolyzable group and, when there are two or more Y groups, they may be the same or different; a represents 0, 1, 2 or 3, b represents 0, 1 or 2, and m is an integer of 0 to 19, provided that the relation $a+mb \geq 1$ should be satisfied.

As the hydrolyzable group, there may be mentioned, among others, a hydrogen atom and those groups which are in general use, for example alkoxy, acyloxy, ketoximate, amino, amido, aminoxy, mercapto and alkenyloxy groups. Among them, alkoxy, amido and aminoxy groups are preferred. In view of mild hydrolyzability and ease of handling, alkoxy groups are particularly preferred.

One to three hydroxyl groups and/or hydrolyzable groups can be bound to each silicon atom and, in the practice of the present invention, it is preferred that $(a+\Sigma b)$ be within the range of 1 to 5. When there are two or more hydrolyzable groups or hydroxyl groups in one crosslinkable silyl group, they may be the same or different. The number of silicon atoms forming the crosslinkable silyl group is not less than 1 and, in the case of silicon atoms connected by siloxane or like bonding, it is preferably not more than 20. Particularly preferred are crosslinkable silyl groups represented by the general formula 9:

$$—Si(R^{12})_{3-a}(Y)_a \quad (9)$$

wherein $R^{12}$, Y and a are the same as defined above, because of ready availability.

Those in which a is 3 (e.g. trimethoxy functional groups) are more rapid in curability than those in which a is 2 (e.g. dimethoxy functional groups) but may have problems with their storage stability or mechanical properties (elongation etc.) in some instances. For attaining a balance between curability and physical properties, one in which a is 2 (e.g. dimethoxy functional groups) and one in which a is 3 (e.g. trimethoxy functional groups) may be used in combination.

Alkenyl Groups

The alkenyl group to be used in the practice of the invention is not particularly restricted but preferably is one represented by the general formula 10:

$$H_2C=C(R^{13})— \quad (10)$$

wherein $R^{13}$ is a hydrogen atom or a hydrocarbon group containing 1 to 20 carbon atoms.

In the general formula 10, $R^{13}$ is a hydrogen atom or a hydrocarbon group containing 1 to 20 carbon atoms, typical examples of which are the following:

—$(CH_2)_n$—$CH_3$, —$CH(CH_3)$—$(CH_2)_n$—$CH_3$, —$CH(CH_2CH_3)$—$(CH_2)_n$—$CH_3$, —$CH(CH_2CH_3)_2$, —$C(CH_3)_2$—$(CH_2)_n$—$CH_3$, —$C(CH_3)(CH_2CH_3)$—$(CH_2)_n$—$CH_3$, —$C_6H_5$, —$C_6H_4(CH_3)$, —$C_6H_3(CH_3)_2$, —$(CH_2)_n$—$C_6H_5$, —$(CH_2)_n$—$C_6H_4(CH_3)$, —$(CH_2)_n$—$C_6H_3(CH_3)_2$ (n being an integer of not less than 0 and the total number of carbon atoms in each group being not more than 20).

Among these, a hydrogen atom is preferred.

It is preferred, though not obligatory, that the alkenyl group(s) in the polymer (II) be not activated by a carbonyl or alkenyl group or an aromatic ring, which is conjugated with the carbon-carbon double bond of the alkenyl group.

The mode of bonding of the alkenyl group to the polymer main chain is not particularly restricted but preferably involves a carbon-carbon bond, ester bond, ether bond, carbonate bond, amide bond, or urethane bond, for instance.

Amino Groups

In the practice of the invention, the amino group is not particularly restricted but includes groups represented by

—$NR^{14}_2$ wherein $R^{14}$ is a hydrogen atom or an organic group containing 1 to 20 carbon atoms and the two $R^{14}$ groups may be the same or different or may be bonded together at the respective other ends to form a ring structure. It may be an ammonium salt represented by

—$(NR^{14}_3)^+X^-$ wherein $R^{14}$ is as defined above and $X^-$ is a counter anion, without any problem.

In the above formulas, $R^{14}$ is a hydrogen atom or a univalent organic group containing 1 to 20 carbon atoms and includes, among others, a hydrogen atom, alkyl groups containing 1 to 20 carbon atoms, aryl groups containing 6 to 20 carbon atoms, and aralkyl groups containing 7 to 20 carbon atoms. The two $R^{14}$ groups may be the same or different, or may be bonded together at the respective other ends to form a ring structure.

Groups Having a Polymerizable Carbon-Carbon Double Bond

The polymerizable carbon-carbon double bond-containing group is preferably a group represented by the general formula 11:

$$—OC(O)C(R^{15})=CH_2 \quad (11)$$

wherein $R^{15}$ represents a hydrogen atom or a univalent organic group containing 1 to 20 carbon atoms, more preferably a group of formula (11) in which $R^{15}$ is a hydrogen atom or a methyl group.

Specific examples of $R^{15}$ in general formula 11 include, but are not particularly limited to, —H, —$CH_3$, —$CH_2CH_3$, —$(CH_2)_nCH_3$ (n being an integer of 2 to 19), —$C_6H_5$, —$CH_2OH$, —CN and the like. Preferred are —H and —$CH_3$, however.

<Functional Group Introduction Method>

In the following, several methods of functional group introduction into the vinyl polymer (II) of the present invention are described, without any purpose of restriction, however.

First, methods of crosslinkable silyl, alkenyl or hydroxyl group introduction by terminal functional group conversion are described. These functional groups each can serve as a precursor of another and, therefore, mention is made in the order from crosslinkable silyl groups to respective precursors.

As methods of synthesizing vinyl polymers having at least one crosslinkable silyl group, there may be mentioned, among others, the following.

(A) Method which comprises causing a crosslinkable silyl group-containing hydrosilane compound to add to a vinyl polymer having at least one alkenyl group in the presence of a hydrosilylation catalyst;

(B) Method which comprises reacting a vinyl polymer having at least one hydroxyl group with a compound having, in each molecule, a crosslinkable silyl group and a group capable of reacting with the hydroxyl group, such as an isocyanato group;

(C) Method which comprises subjecting a compound having, in each molecule, a polymerizable alkenyl group and a crosslinkable silyl group to reaction in synthesizing a vinyl polymer by radical polymerization;

(D) Method which comprises using a crosslinkable silyl group-containing chain transfer agent in synthesizing a vinyl polymer by radical polymerization; and (E) Method which comprises reacting a vinyl polymer having at least one highly reactive carbon-halogen bond with a compound having, in each molecule, a crosslinkable silyl group and a stable carbanion.

The vinyl polymer having at least one alkenyl group, which is to be used in the above method (A), can be obtained by various methods. Several methods of synthesis are mentioned below, without any purpose of restriction, however.

(A-a) Method comprising subjecting to reaction a compound having, in each molecule, a polymerizable alkenyl group together with a low polymerizability alkenyl group, such as one represented by the general formula 12 shown below, as a second monomer in synthesizing a vinyl polymer by radical polymerization:

$$H_2C=C(R^{16})—R^{17}—R^{18}—C(R^{19})=CH_2 \quad (12)$$

wherein $R^{16}$ represents a hydrogen atom or a methyl group, $R^{17}$ represents —C(O)O— or an o-, m- or p-phenylene group, $R^{18}$ represents a direct bond or a bivalent organic group containing 1 to 20 carbon atoms, which may contain one or more ether bonds, and $R^{19}$ represents a hydrogen atom, an alkyl group containing 1 to 20 carbon atoms, an aryl group containing 6 to 20 carbon atoms or an aralkyl group containing 7 to 20 carbon atoms.

The time when the compound having, in each molecule, a polymerizable alkenyl group and a low polymerizability alkenyl group is subjected to reaction is not particularly restricted but, in particular in living radical polymerization and when rubber-like properties are expected, the compound is preferably subjected to reaction as a second monomer at the final stage of the polymerization reaction or after completion of the reaction of the monomer(s) employed.

(A-b) Method comprising subjecting to reaction a compound having at least two low polymerizability alkenyl groups, for example 1,5-hexadiene, 1,7-octadiene or 1,9-decadiene, at the final stage of the polymerization or after completion of the reaction of the monomer(s) employed in vinyl polymer synthesis by living radical polymerization.

(A-c) Method comprising reacting a vinyl polymer having at least one highly reactive carbon-halogen bond with one of various alkenyl-containing organometallic compounds, for example an organotin such as allyltributyltin or allyltrioctyltin, for substitution for the halogen.

(A-d) Method comprising reacting a vinyl polymer having at least one highly reactive carbon-halogen bond with a stabilized, alkenyl-containing carbanion, such as one represented by the general formula 13, for substitution for the halogen:

$$M^+C^-(R^{20})(R^{21})-R^{22}-C(R^{19})=CH_2 \qquad (13)$$

wherein $R^{19}$ is as defined above, $R^{20}$ and $R^{21}$ each is an electron-withdrawing group capable of stabilizing the carbanion $C^-$ or one of them is such an electron-withdrawing group and the other represents a hydrogen atom, an alkyl group containing 1 to 10 carbon atoms or a phenyl group, $R^{22}$ represents a direct bond or a bivalent organic group containing 1 to 10 carbon atoms, which may contain one or more ether bonds, and $M^+$ represents an alkali metal ion or a quaternary ammonium ion.

Particularly preferred as the electron-withdrawing group $R^{20}$ and/or $R^{21}$ are those which have a structure of $-CO_2R$, $-C(O)R$ or $-CN$.

(A-e) Method comprising reacting a vinyl polymer having at least one highly reactive carbon-halogen bond with a simple substance metal, such as zinc, or an organometallic compound and then reacting the thus-prepared enolate anion with an alkenyl-containing, electrophilic compound, such as an alkenyl-containing compound having a leaving group such as a halogen atom or an acetyl group, an alkenyl-containing carbonyl compound, an alkenyl-containing isocyanate compound or an alkenyl-containing acid halide.

(A-f) Method comprising reacting a vinyl polymer having at least one highly reactive carbon-halogen bond with an alkenyl-containing oxy anion or carboxylate anion, such as one represented by the general formula (14) or (15), for substitution for the halogen:

$$H_2C=C(R^{19})-R^{23}-O^-M^+ \qquad (14)$$

wherein $R^{19}$ and $M^+$ are the same as defined above and $R^{23}$ is a bivalent organic group containing 1 to 20 carbon atoms, which may contain one or more ether bonds;

$$H_2C=C(R^{19})-R^{24}-C(O)O^-M^+ \qquad (15)$$

wherein $R^{19}$ and $M^+$ are the same as defined above and $R^{24}$ is a direct bond or a bivalent organic group containing 1 to 20 carbon atoms, which may contain one or more ether bonds.

The method of synthesizing the above-mentioned vinyl polymer having at least one highly reactive carbon-halogen bond includes, but is not limited to, atom transfer radical polymerization techniques using an organic halide or the like as initiator and a transition metal complex as catalyst, as mentioned above.

It is also possible to obtain the vinyl polymer having at least one alkenyl group from a vinyl polymer having at least one hydroxyl group. As utilizable methods, there may be mentioned, for example, the following, without any purpose of restriction.

(A-g) Method comprising reacting the hydroxyl group(s) of a vinyl polymer having at least one hydroxyl group with a base, such as sodium methoxide, followed by reaction with an alkenyl-containing halide, such as allyl chloride.

(A-h) Method comprising reacting such hydroxyl group(s) with an alkenyl-containing isocyanate compound, such as allyl isocyanate.

(A-i) Method comprising reacting such hydroxyl group(s) with an alkenyl-containing acid halide, such as (meth) acrylic acid chloride, in the presence of a base, such as pyridine.

(A-j) Method comprising reacting such hydroxyl group(s) with an alkenyl-containing carboxylic acid, such as acrylic acid, in the presence of an acid catalyst.

In the practice of the present invention, when no halogen is directly associated in the alkenyl group introduction, as in the method (A-a) or (A-b), the vinyl polymer is preferably synthesized by living radical polymerization. From the viewpoint of ready controllability, the method (A-b) is more preferred.

In cases where alkenyl group introduction is effected by conversion of the halogen atom(s) of a vinyl polymer having at least one highly reactive carbon-halogen atom, use is preferably made of a vinyl polymer having at least one terminal carbon-halogen bond, which is highly reactive, obtainable by subjecting a vinyl monomer(s) to radical polymerization (atom transfer radical polymerization) using, as an initiator, an organic halide or halogenated sulfonyl compound having at least one highly reactive carbon-halogen bond and, as a catalyst, a transition metal complex. In view of more ready controllability, the method (A-f) is more preferred.

The crosslinkable silyl group-containing hydrosilane compound is not particularly restricted but includes, as typical examples, compounds represented by the general formula 16:

$$H-[Si(R^{11})_{2-b}(Y)_b]_m-Si(R^{12})_{3-a}(Y)_a \qquad (16)$$

wherein $R^{11}$ and $R^{12}$ each represents an alkyl group containing 1 to 20 carbon atoms, an aryl group containing 6 to 20 carbon atoms, an aralkyl group containing 7 to 20 carbon atoms or a triorganosiloxy group represented by $(R')_3SiO-$ (in which R' is a univalent hydrocarbon group containing 1 to 20 carbon atoms and the three R' groups may be the same or different) and, when there are two or more $R^{11}$ or $R^{12}$ groups, they may be the same or different; Y represents a hydroxyl group or a hydrolyzable group and, when there are two or more Y groups, they may be the same or different; a represents 0, 1, 2 or 3, b represents 0, 1 or 2 and m is an integer of 0 to 19, provided that the relation $a+mb \geq 1$ should be satisfied.

Particularly preferred among those hydrosilane compounds in view of ready availability are crosslinkable group-containing compounds represented by the general formula 17:

$$H-Si(R^{12})_{3-a}(Y)_a \qquad (17)$$

wherein $R^{12}$, Y and a are the same as defined above.

In causing the above crosslinkable silyl-containing hydrosilane, compound to add to the alkenyl group, a transition metal catalyst is generally used. The transition metal catalyst includes, among others, simple substance platinum, solid platinum dispersed in/on a carrier such as alumina, silica or carbon black, chloroplatinic acid, chloroplatinic acid complexes with alcohols, aldehydes, ketones or the like, platinum-olefin complexes, and platinum(0)-divinyltetramethyldisiloxane complex. As other catalysts than platinum compounds, there may be mentioned $RhCl(PPh_3)_3$, $RhCl_3$, $RuCl_3$, $IrCl_3$, $FeCl_3$, $AlCl_3$, $PdCl_2.H_2O$, $NiCl_2$ and $TiCl_4$, for instance.

The method of producing the vinyl polymer having at least one hydroxyl group, which polymer is to be used in the methods (B) and (A-g) to (A-j), includes, but is not limited to, the following, among others.

(B-a) Method comprising subjecting to reaction, as a second monomer, a compound having both a polymerizable alkenyl group and a hydroxyl group in each molecule, for example one represented by the general formula 18 given below, in synthesizing the vinyl polymer by radical polymerization:

$$H_2C=C(R^{16})-R^{17}-R^{18}-OH \qquad (18)$$
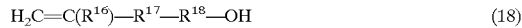

wherein $R^{16}$, $R^{17}$ and $R^{18}$ are the same as defined above.

The time for subjecting to reaction the compound having both a polymerizable alkenyl group and a hydroxyl group in each molecule is not critical but, in particular in living radical polymerization, when rubber-like properties are demanded, the compound is preferably subjected to reaction as a second monomer at the final stage of the polymerization reaction or after completion of the reaction of the main monomer(s).

(B-b) Method comprising subjecting an alkenyl alcohol, such as 10-undecenol, 5-hexenol or allyl alcohol, to reaction at the final stage of polymerization reaction or after completion of the reaction of the main monomer(s) in synthesizing the vinyl polymer by living radical polymerization.

(B-c) Method comprising radical-polymerizing a vinyl monomer(s) using a hydroxyl-containing chain transfer agent, such as a hydroxyl-containing polysulfide, in large amounts, as described in Japanese Kokai Publication Hei-05-262808, for instance.

(B-d) Method comprising subjecting a vinyl monomer(s) to radical polymerization using hydrogen peroxide or a hydroxyl-containing initiator, as described in Japanese Kokai Publication Hei-06-239912 or Japanese Kokai Publication Hei-08-283310, for instance.

(B-e) Method comprising subjecting a vinyl monomer(s) to radical polymerization using an alcohol in excess, as described in Japanese Kokai Publication Hei-06-116312, for instance.

(B-f) Method comprising introducing a terminal hydroxyl group(s) by hydrolyzing the halogen atom(s) of a vinyl polymer having at least one highly reactive carbon-halogen bond or reacting such halogen atom(s) with a hydroxyl-containing compound, according to the method described in Japanese Kokai Publication Hei-04-132706, for instance.

(B-g) Method comprising reacting a vinyl polymer having at least one highly reactive carbon-halogen bond with a hydroxyl-containing stabilized carbanion, such as one represented by the general formula 19, for substitution for the halogen atom:

$$M^+C^-(R^{20})(R^{21})-R^{22}-OH \qquad (19)$$

wherein $R^{20}$, $R^{21}$ and $R^{22}$ are the same as defined above.

Particularly preferred as the electron-withdrawing groups $R^{20}$ and $R^{21}$ are those having a structure of $-CO_2R$, $-C(O)R$ or $-CN$.

(B-h) Method comprising reacting a vinyl polymer having at least one highly reactive carbon-halogen bond with a simple substance metal, such as zinc, or an organometallic compound and then reacting the thus-prepared enolate anion with an aldehyde or ketone.

(B-i) Method comprising reacting a vinyl polymer having at least one highly reactive carbon-halogen bond with a hydroxyl-containing oxy anion or carboxylate anion, such as one represented by the general formula 20 or 21 given below, for substitution for the halogen atom:

$$HO-R^{23}-O^-M^+ \qquad (20)$$

wherein $R^{23}$ and $M^+$ are the same as defined above;

$$HO-R^{24}-C(O)O^-M^+ \qquad (21)$$

wherein $R^{24}$ and $M^+$ are the same as defined above.

(B-j) Method comprising subjecting, as a second monomer, a compound having a low polymerizability alkenyl group and a hydroxyl group in each molecule to reaction at the final stage of the polymerization reaction or after completion of the reaction of the main monomer(s) in synthesizing the vinyl polymer by living radical polymerization.

Such compound is not particularly restricted but may be a compound represented by the general formula 22, for instance:

$$H_2C=C(R^{16})-(R^{23})-OH \qquad (22)$$

wherein $R^{16}$ and $R^{23}$ are the same as defined above.

The compound represented by the above general formula 22 is not particularly restricted but, in view of ready availability, alkenyl alcohols such as 10-undecenol, 5-hexenol and allyl alcohol are preferred.

In the practice of the present invention, when no halogen is directly associated in hydroxyl group introduction, as in the methods (B-a) to (B-e) and (B-j), the vinyl polymer is preferably synthesized by living radical polymerization. The method (B-b) is more preferred because of ready controllability.

In cases where hydroxyl group introduction is effected by conversion of the halogen atom(s) of a vinyl polymer having at least one highly reactive carbon-halogen bond, use is preferably made of a vinyl polymer having at least one terminal carbon-halogen bond, which is highly reactive, as obtained by subjecting a vinyl monomer(s) to radical polymerization (atom transfer radical polymerization) using an organic halide or halogenated sulfonyl compound as an initiator and, as a catalyst, a transition metal complex. From the ready controllability viewpoint, the method (B-i) is more preferred.

As the compound having a crosslinkable silyl group and a group capable of reacting with a hydroxyl group, such as an isocyanato group, in each molecule, there may be mentioned, for example, γ-isocyanatopropyltrimethoxysilane, γ-isocyanatopropylmethyldimethoxysialne, γ-isocyanatopropyltriethoxysilane and the like. If necessary, any of urethane formation reaction catalysts generally known in the art can be used.

The compound having both a polymerizable alkenyl group and a crosslinkable silyl group in each molecule, which is to be used in the method (C), includes, among others, trimethoxysilylpropyl (meth)acrylate, methyldimethoxysilylpropyl (meth)acrylate and like compounds represented by the general formula 23:

$$H_2C=C(R^{16})-R^{17}-R^{25}-[Si(R^{11})_{2-b}(Y)^bO]_m-Si(R^{12})_{3-a}(Y)_a \quad (23)$$

wherein $R^{11}$, $R^{12}$, $R^{16}$, $R^{17}$, Y, a, b and m are the same as defined above and $R^{25}$ is a direct bond or a bivalent organic group containing 1 to 20 carbon atoms, which may contain one or more ether bonds.

The time for subjecting the compound having both a polymerizable alkenyl group and a crosslinkable silyl group in each molecule is not critical but, in living radical polymerizationm in particular, and when rubber-like properties are demanded, the compound is preferably subjected to reaction as a second monomer at the final stage of the polymerization reaction or after completion of the reaction of the main monomer(s).

As the crosslinkable silyl-containing chain transfer agent to be used in the chain transfer agent method (D), there may be mentioned crosslinkable silyl-containing mercaptans and crosslinkable silyl-containing hydrosilanes, as described in Japanese Kokoku Publication Hei-03-14068 and Japanese Kokoku Publication Hei-04-55444, among others.

The method of synthesizing the vinyl polymer having at least one highly reactive carbon-halogen bond, which is to be used in the method (E), includes, but is not limited to, the atom transfer radical polymerization method which uses an organic halide or the like as an initiator and a transition metal complex as a catalyst. As the compound having both a crosslinkable silyl group and a stabilized carbanion in each molecule, there may be mentioned compounds represented by the general formula 24:

$$M^+C^-(R^{20})(R^{21})-R^{26}-C(H)(R^{27})-CH_2-[Si(R^{11})_{2-b}(Y)_bO]_m-Si(R^{12})_{3-a}(Y)_a \quad (24)$$

wherein $R^{11}$, $R^{12}$, $R^{20}$, $R^{21}$, Y, a, b and m are the same as defined above, $R^{26}$ is a direct bond or a bivalent organic group containing 1 to 10 carbon atoms, which may contain one or more ether bonds, and $R^{27}$ represents a hydrogen atom, an alkyl group containing 1 to 10 carbon atoms, an aryl group containing 6 to 10 carbon atoms or an aralkyl group containing 7 to 10 carbon atoms. Particularly preferred as the electron-withdrawing groups $R^{20}$ and $R^{21}$ are those having a structure of $-CO_2R$, $-C(O)R$ or $-CN$.

Epoxy Group

In the practice of the present invention, the vinyl polymer having a terminal reactive functional group(s) is produced by the following steps, though mentioning thereof has no restrictive meaning:

(1) producing a vinyl polymer by polymerizing a vinyl monomer(s) by living radical polymerization; and then
(2) reacting the polymer with a compound having a reactive functional group and an ethylenically unsaturated group.

Mention may also be made of the method comprising subjecting allyl alcohol to reaction at the final stage of atom transfer radical polymerization and then causing epoxy ring formation from the hydroxyl and halogen groups.

Amino Group

The method of producing the vinyl polymer having at least one main chain terminal amino group may comprise the following steps:

(1) producing a vinyl polymer having at least one main chain terminal halogen group; and
(2) converting the terminal halogen group to an amino-containing substituent using an amino-containing compound.

The amino-containing substituent is not particularly restricted but includes, for example, groups represented by the general formula 25:

$$-O-R^{28}-NR^{14}_2 \quad (25)$$

wherein $R^{28}$ represents a bivalent organic group containing 1 to 20 carbon atoms, which may contain one or more ether or ester bonds; $R^{14}$ represents a hydrogen atom or a univalent organic group containing 1 to 20 carbon atoms and the two $R^{14}$ groups may be the same or different or may be bonded together at the respective other ends to form a ring structure.

In the above general formula 25, $R^{28}$ is a bivalent organic group containing 1 to 20 carbon atoms, which may contain one or more ether or ester bonds, and includes, among others, alkylene groups containing 1 to 20 carbon atoms, arylene groups containing 6 to 20 carbon atoms and aralkylene groups containing 7 to. 20 carbons atoms and, preferably, groups represented by:

$$-C_6H_4-R^{29}$$

wherein $C_6H_4$ represents a phenylene group and $R^{29}$ represents a direct bond or a bivalent organic group containing 1 to 14 carbon atoms, which may contain one or more ether or ester bonds, or $$-C(O)-R^{30}-$$

wherein $R^{30}$ represents a direct bond or a bivalent organic group containing 1 to 19 carbon atoms, which may contain one or more ether or ester bonds.

An amino group can be introduced into a polymer terminus by converting a terminal halogen of the vinyl polymer. The method of substitution is not particularly restricted but, from the ready reaction controllability viewpoint, a nucleophilic substitution reaction using an amino-containing compound as a nucleophile agent is preferred. As such nucleophile agent, there may be mentioned compounds having both a hydroxyl group and an amino group as represented by the general formula 26:

$$HO-R^{28}-NR^{14}_2 \quad (26)$$

wherein $R^{28}$ represents a bivalent organic group containing 1 to 20 carbon atoms, which may contain one or more ether or ester bonds; $R^{14}$ represents a hydrogen atom or a univalent organic group containing 1 to 20 carbon atoms and the two $R^{14}$ groups may be the same or different or may be bonded together at the respective other ends to form a ring structure.

In the above general formula 26, $R^{28}$ is a bivalent organic group containing 1 to 20 carbon atoms, which may contain one or more ether or ester bonds, and includes, for example, alkylene groups containing 1 to 20 carbon atoms, arylene groups containing 6 to 20 carbons and aralkylene groups containing 7 to 20 carbon atoms. Among these compounds having both a hydroxyl group and an amino group, aminophenols of the above general formula in which $R^{28}$ is represented by $$-C_6H_4-R^{29}-$$

wherein $C_6H_4$ represents a phenylene group and $R^{29}$ represents a direct bond or a bivalent organic group containing 1 to 14 carbon atoms, which may contain one or more ether or ester bonds; and amino acids of the above formula in which $R^{28}$ is represented by $$-C(O)-R^{30}-$$

wherein $R^{30}$ represents a direct bond or a bivalent organic group containing 1 to 19 carbon atoms, which may contain one or more ether or ester bonds, are preferred.

As specific compounds, there may be mentioned, among others, ethanolamine; o-, m- or p-aminophenol; o-, m- or p-NH$_2$—C$_6$H$_4$—CO$_2$H; glycine, alanine and aminobutanoic acid.

A compound having both an amino group and an oxy anion can be used as the nucleophilic reagent. Such compound is not particularly restricted but includes, for example, compounds represented by the general formula 27:

$$M^+O^-\text{—}R^{28}\text{—}NR^{14}{}_2 \tag{27}$$

wherein R$^{28}$ represents a bivalent organic group containing 1 to 20 carbon atoms, which may contain one or more ether or ester bonds; R$^{14}$ represents a hydrogen atom or a univalent organic group containing 1 to 20 carbon atoms and the two R$^{14}$ groups may be the same or different or may be bonded together at the respective other ends to form a ring structure; and M$^+$ represents an alkali metal ion or a quaternary ammonium ion.

In the above general formula 27, M$^+$ is a counter cation to the oxy anion and represents an alkali metal ion or a quaternary ammonium ion. The alkali metal ion includes the lithium ion, sodium ion, potassium ion, etc., and preferably is the sodium ion or potassium ion. The quaternary ammonium ion includes the tetramethylammonium ion, tetraethylammonium ion, trimethylbenzylammonium ion, trimethyldodecylammonium ion, tetrabutylammonium ion, dimethylpiperidinium ion, etc.

Among the above-mentioned compounds having both an amino group and an oxy anion, salts of aminophenols represented by the general formula 28 given below or salts of amino acids represented by the general formula 29 given below are preferred in view of ready controllability of the substitution reaction or their ready availability:

$$M^+O^-\text{—}C_6H_4\text{—}R^{29}\text{—}NR^{14}{}_2 \tag{28}$$

$$M^+O^-\text{—}C(O)\text{—}R^{30}\text{—}NR^{14}{}_2 \tag{29}$$

wherein C$_6$H$_4$ represents a phenylene group, R$^{29}$ represents a direct bond or a bivalent organic group containing 1 to 14 carbon atoms, which may contain one or more ether or ester bonds; R$^{30}$ represents a direct bond or a bivalent organic group containing 1 to 19 carbon atoms, which may contain one or more ether or ester bonds; R$^{14}$ represents a hydrogen atom or a univalent organic group containing 1 to 20 carbon atoms and the two R$^{14}$ groups may be the same or different or may be bonded together at the respective other ends to form a ring structure; and M$^+$ is as defined above.

The oxy anion-containing compound represented by the general formula 27, 28 or 29 can be obtained with ease by reacting a compound represented by the general formula 26 with a basic compound.

Various compounds can be used as the basic compound. Examples are sodium methoxide, potassium methoxide, lithium methoxide, sodium ethoxide, potassium ethoxide, lithium ethoxide, sodium tert-butoxide, potassium tert-butoxide, sodium carbonate, potassium carbonate, lithium carbonate, sodium hydrogen carbonate, sodium hydroxide, potassium hydroxide, sodium hydride, potassium hydride, methyllithium, ethyllithium, n-butyllithium, tert-butyllithium, lithiumdiisopropylamide, lithiumhexamethyldisilazide, and the like. The amount of the above base is not particularly restricted but generally is 0.5 to 5 equivalents, preferably 0.8 to 1.2 equivalents, relative to the above precursor.

As the solvent to be used in reacting the above precursor with the above base, there may be mentioned, among others, hydrocarbon solvents such as benzene and toluene; ether solvents such as diethyl ether and tetrahydrofuran; halogenated hydrocarbon solvents such as methylene chloride and chloroform; ketone solvents such as acetone, methyl ethyl ketone and methyl isobutyl ketone; alcohol solvents such as methanol, ethanol, propanol, isopropanol, n-butyl alcohol and tert-butyl alcohol; nitrile solvents such as acetonitrile, propionitrile and benzonitrile; ester solvents such as ethyl acetate and butyl acetate; carbonate solvents such as ethylene carbonate and propylene carbonate; amide solvents such as dimethylformamide and dimethylacetamide; and sulfoxide solvents such as dimethyl sulfoxide. These may be used singly or two or more of them may be used in admixture.

The oxy anion-containing compound in which M$^+$ is a quaternary ammonium ion can be obtained by preparing the corresponding compound in which M$^+$ is an alkali metal ion and reacting the same with a quaternary ammonium halide. As example of the quaternary ammonium halide, there may be mentioned tetramethylammonium halides, tetraethylammonium halides, trimethylbenzylammonium halides, trimethyldodecylammonium halides, and tetrabutylammonium halides.

Various solvents may be used for the substitution a reaction of the polymer terminal halogen. As examples, there may be mentioned hydrocarbon solvents such as benzene and toluene; ether solvents such as diethyl ether and tetrahydrofuran; halogenated hydrocarbon solvents such as methylene chloride and chloroform; ketone solvents such as acetone, methyl ethyl ketone and methyl isobutyl ketone; alcohol solvents such as methanol, ethanol, propanol, isopropanol, n-butyl alcohol and tert-butyl alcohol; nitrile solvents such as acetonitrile, propionitrile and benzonitrile; ester solvents such as ethyl acetate and butyl acetate; carbonate solvents such as ethylene carbonate and propylene carbonate; amide solvents such as dimethylformamide and dimethylacetamide; and sulfoxide solvents such as dimethyl sulfoxide. These may be used singly or in the form of a mixture of two or more.

The reaction can be carried out at a temperature of 0 to 150° C. The amount of the amino-containing compound is not particularly restricted but generally is 1 to 5 equivalents, preferably 1 to 1.2 equivalents, relative to the polymer terminal halogen.

A basic compound may be added to the reaction mixture for promoting the nucleophilic substitution reaction. As such basic compound, there may be mentioned those already mentioned hereinabove as well as alkylamines such as trimethylamine triethylamine and tributylamine; polyamines such as tetramethylethylenediamine and pentamethyldiethylenetriamine; pyridine compounds such as pyridine and picoline, and so on.

In cases where the amino group in the amino-containing compound used in the nucleophilic substitution reaction affects the nucleophilic substitution reaction, the amino group is preferably protected with an appropriate substituent. Such substituent includes, among others, benzyloxycarbonyl, t-butoxycarbonyl and 9-fluorenylmethoxycarbonyl group.

Mention may further be made of the method comprising substituting a halogen terminus of a vinyl polymer with an azido anion and then reducing the same with LAH or the like.

Polymerizable Carbon-Carbon Double Bond-Containing Groups

The method of introducing a polymerizable carbon-carbon double bond-containing group into a polymer to give the polymer (II) according to the invention is not particularly restricted but may be any of the following:

(i) Method comprising substituting a compound having a radical-polymerizable carbon-carbon double bond for a halogen group of a vinyl polymer. A specific method comprises reacting a vinyl polymer having a structure represented by the general formula 30:

$$—CR^{31}R^{32}X \quad (30)$$

wherein $R^{31}$ and $R^{32}$ each represents a group bonded to an ethylenically unsaturated group of the vinyl monomer and X represents a chlorine, bromine or iodine atom, with a compound represented by the general formula 31:

$$M^+—OC(O)C(R^{15})=CH_2 \quad (31)$$

wherein $R^{15}$ represents a hydrogen atom or an organic group containing 1 to 20 carbon atoms and $M^+$ represents an alkali metal ion or a quaternary ammonium ion.

(ii) Method comprising reacting a hydroxyl-containing vinyl polymer with a compound represented by the general formula 32:

$$XC(O)C(R^{15})=CH_2 \quad (32)$$

wherein $R^{15}$ represents a hydrogen atom or an organic group containg 1 to 20 carbon atoms and X represents a chlorine or bromine atom or a hydroxyl group.

(iii) Method comprising reacting a hydroxyl-containing vinyl polymer with a diisocyanate compound and then reacting the residual isocyanato group with a compound represented by the general formula 33:

$$HO—R^{33}—OC(O)C(R^{15})=CH_2 \quad (33)$$

wherein $R^{15}$ represents a hydrogen atom or an organic group containing 1 to 20 carbon atoms and $R^{33}$ represents a bivalent organic group containing 2 to 20 carbon atoms. In the following, these methods are described in detail. The above method (i) is described.

(i) The method comprising reacting a vinyl polymer having a terminal structure represented by the general formula 30:

$$—CR^{31}R^{32}X \quad (30)$$

wherein $R^{31}$ and $R^{32}$ each represents a group bonded to an ethylenically unsaturated group of the vinyl monomer and X represents a chlorine, bromine or iodine atom, with a compound represented by the general formula 31:

$$M^+—OC(O)C(R^{15})=CH_2 \quad (31)$$

wherein $R^{15}$ represents a hydrogen atom or an organic group containing 1 to 20 carbon atoms and $M^+$ represents an alkali metal ion or a quaternary ammonium ion.

The vinyl polymer having a terminal structure represented by the general formula 30 is produced by the method comprising polymerizing a vinyl monomer(s) using the above-described organic halide or halogenated sulfonyl compound as an initiator and the transition metal complex as a catalyst, or by the method comprising polymerizing a vinyl monomer(s) using a halogen compound as a chain transfer agent, preferably by the former method.

The compound represented by the general formula 31 is not particularly restricted but, as specific examples of $R^{15}$, there maybe mentioned —H, —$CH_3$, —$CH_2CH_3$, —$(CH_2)_n$ $CH_3$ (n being an integer of 2 to 19), —$C_6H_5$, —$CH_2OH$, —CN and the like. Among them, —H and —$CH_3$ are preferred. $M^+$ is the counter cation to the oxy anion and $M^+$ includes, as species thereof, alkali metal ions, specifically the lithium ion, sodium ion and potassium ion, and quaternary ammonium ions. As the quaternary ammonium ions, there may be mentioned the tetramethylammonium ion, tetraethylammonium ion, tetrabenzylammonium ion, trimethyldodecylammonium ion, tetrabutylammonium ion and dimethylpiperidinium ion, etc. The sodium ion and potassium ion are preferred, however. The oxy anion of general formula 31 is used preferably in an amount of 1 to 5 equivalents, more preferably 1.0 to 1.2 equivalents, relative to the halogen group of general formula 30. The solvent to be used in carrying out this reaction is not particularly restricted but preferably is a polar solvent since the reaction is a nucleophilic substitution reaction. Thus usable are tetrahydrofuran, dioxane, diethyl ether, acetone, dimethyl sulfoxide, dimethylformamide, dimethylacetamide, hexamethylphosphoric triamide, acetonitrile and the like. The temperature for carrying out the reaction is not particularly restricted but, generally, the reaction is carried out at 0 to 150° C., preferably at room temperature to 100° C. so that the polymerizable terminal group may be retained.

The above-mentioned method (ii) is described.

(ii) The method comprising reacting a hydroxyl-containing vinyl polymer with a compound represented by the general formula 32:

$$XC(O)C(R^{15})=CH_2 \quad (32)$$

wherein $R^{15}$ represents a hydrogen atom or an organic group containing 1 to 20 carbon atoms and X represents a chlorine or bromine atom or a hydroxyl group.

The compound represented by the general formula 32 is not particularly restricted but, as specific examples of $R^{15}$, there maybe mentioned —H, —$CH_3$, —$CH_2CH_3$, —$(CH_2)_n$ $CH_3$ (n being an integer of 2 to 19), —$C_6H_5$, —$CH_2OH$, —CN and the like. Among them, —H and —$CH_3$ are preferred.

The vinyl polymer having a hydroxyl group(s), preferably at a terminus or termini, is produced by the method comprising polymerizing a vinyl monomer(s) using the above-mentioned organic halide or halogenated sulfonyl compound as an initiator and the transition metal complex as a catalyst, or by the method comprising polymerizing a vinyl monomer(s) using a hydroxyl-containing compound as a chain transfer agent, preferably by the former method. Such method of producing hydroxyl-containing vinyl polymers includes; but is not limited to, the following:

(a) Method comprising subjecting a compound having both a polymerizable alkenyl group and a hydroxyl group in each molecule, which is represented by the general formula 34, for instance:

$$H_2C=C(R^{34})—R^{35}—R^{36}—OH \quad (34)$$

(wherein $R^{34}$ is an organic group containing 1 to 20 carbon atoms but preferably is a hydrogen atom or a methyl group, and may be the same or different; $R^{35}$ represents —C(O)O— (ester group) or an o-, m- or p-phenylene group; $R^{36}$ represents a direct bond or a bivalent organic group containing 1 to 20 carbon atoms, which may contain one or more ether bonds; the compound being a (meth)acrylate compound when $R^{35}$ is an ester group, or a styrenic compound when $R^{35}$ is a phenylene group), to reaction as a second monomer in synthesizing a vinyl polymer by living radical polymerization.

The time for subjecting the compound having both a polymerizable alkenyl group and a hydroxyl group in each molecule to reaction is not critical but, in particular when rubber-like properties are demanded, the compound is preferably subjected to reaction as a second monomer at the final stage of the polymerization reaction or after completion of the reaction of the main monomer(s).

(b) Method comprising subjecting a compound having a low-polymerizability alkenyl group and a hydroxyl group in each molecular to reaction as a second monomer in synthesizing a vinyl-polymer by living radical polymerization at the final stage of the polymerization reaction or after completion of the reaction of the main monomer(s).

Such compound is not particularly restricted but includes, among others, compounds represented by the general formula 35:

$$H_2C=C(R^{34})-R^{37}-OH \quad (35)$$

wherein $R^{34}$ is as defined above; and $R^{37}$ represents a bivalent organic group containing 1 to 20 carbon atoms, which may contain one or more ether bonds.

The compound represented by the general formula 35 is not particularly restricted but preferably includes alkenyl alcohols such as 10-undecenol, 5-hexenol and ally alcohol because of their ready availability.

(c) Method comprising introducing a terminal hydroxyl group(s) by hydrolyzing the halogen atom(s) of a vinyl polymer having at least one highly reactive carbon-halogen bond or reacting such halogen atom(s) with a hydroxyl-containing compound, according to the method described in Japanese Kokai Publication Hei-04-132706, for instance.

(d) Method involving halogen substitution which comprises reacting a vinyl polymer having at least one carbon-halogen bond such as one represented by the general formula 30, as obtained by atom transfer radical polymerization, with a hydroxyl-containing stabilized carbanion such as one represented by the general formula 36:

$$M^+C^-(R^{38})(R^{39})-R^{37}-OH \quad (36)$$

wherein $R^{37}$ is as defined above; and $R^{38}$ and $R^{39}$ each represents an electron-withdrawing group capable of stabilizing the carbanion $C^-$ or one of them represents such an electron-withdrawing group and the other represents a hydrogen atom, an alkyl group containing 1 to 10 carbon atoms or a phenyl group. As the electron-withdrawing groups $R^{38}$ and $R^{39}$, there may be mentioned —CO$_2$R (ester group), —C(O)R (keto group), —CON(R$_2$)(amide group), —COSR (thioester group), —CN (nitrile group), —NO$_2$ (nitro group), etc. The substituent R is an alkyl group containing 1 to 20 carbon atoms, an aryl group containing 6 to 20 carbon atoms or an aralkyl group containing 7 to 20 carbon atoms, preferably an alkyl group containing 1 to 10 carbon atoms or a phenyl group. Particularly preferred as $R^{38}$ and $R^{39}$ are —CO$_2$R, —C(O)R and —CN.

(e) Method comprising reacting a vinyl polymer obtainable by atom transfer radical polymerization and having at least one carbon-halogen bond such as one represented by the general formula 30 with a simple substance metal, such as zinc, or an organometallic compound and then reacting the thus-prepared enolate anion with an aldehyde or ketone.

(f) Method comprising reacting a vinyl polymer having at least one polymer terminal halogen, preferably a halogen group represented by the general formula 30, with a hydroxyl-containing oxy anion represented by the general formula 37 shown below, for instance, or a hydroxyl-containing carboxylate anion represented by the general formula 38, for instance, for substituting a hydroxyl-containing group for the halogen:

$$HO-R^{37}-O^-M^+ \quad (37)$$

wherein $R^{37}$ and $M^+$ are the same as defined above;

$$HO-R^{37}-C(O)O^-M^+ \quad (38)$$

wherein $R^{37}$ and $M^+$ are the same as defined above.

In the practice of the invention, when no halogen is directly associated in the hydroxyl group introduction as in the methods (a) and (b), the method (b) is more preferred because of more ready controllability.

In cases where the hydroxyl group introduction is effected by conversion of the halogen of a vinyl polymer having at least one carbon-halogen bond, such as in the methods (c) to (f), the method (f) is more preferred because of easier controllability.

The above method (iii) is now described.

(iii) The method comprising reacting a hydroxyl-containing vinyl polymer with a diisocyanate compound and then reacting the residual isocyanato group with a compound represented by the general formula 39:

$$HO-R^{33}-OC(O)C(R^{15})=CH_2 \quad (39)$$

wherein $R^{15}$ represents a hydrogen atom or an organic group containing 1 to 20 carbon atoms and $R^{33}$ represents a bivalent organic group containing 2 to 20 carbon atoms.

The compound represented by the general formula 39 is not particularly restricted but, as specific examples of $R^{15}$, there may be mentioned —H, —CH$_3$, —CH$_2$CH$_3$, —(CH$_2$)$_n$CH$_3$ (n being an integer of 2 to 19), —C$_6$H$_5$, —CH$_2$OH, —CN and the like. Among them, —H and —CH$_3$ are preferred. As a typical compound, there may be mentioned 2-hydroxypropyl methacrylate.

The terminal hydroxyl-containing vinyl polymer is the same as mentioned hereinabove.

The diisocyanate compound is not particularly restricted but may be any of those known in the art, for example toluylene diisocyanate, 4,4'-diphenylmethanediisocyanate, hexamethylene diisocyanate, xylylene diisocyanate, metaxylylene diisocyanate, 1,5-naphthalenediisocyanate, hydrogenated diphenylmethanediisocyanate, hydrogenated toluylene diisocyanate, hydrogenated xylylene diisocyanate, isophoronediisocyanate, and like isocyanate compounds. These may be used singly or two or more of them may be used in combination. These may also be used in the form of blocked isocyanates.

For making better use of the excellent weatherability, the use of aromatic ring-free diisocyanate compounds such as hexamethylene diisocyanate and hydrogenated diphenylmethanediisocyanate is preferred.

<<Re: Compatibilizing Agent (III)>>

The compatibilizing agent, namely component (III), to be used according to the present invention is a component to be added to compatibilize the polyether polymer (I) with the vinyl polymer (II) and is a copolymer produced by copolymerization of a plurality of vinyl monomers.

Preferred as the compatibilizing agent (III) according to the present invention are vinyl copolymers obtainable by copolymerizing at least one vinyl monomer among the monomers used in polymerizing the vinyl polymer (II) and another vinyl monomer. Such vinyl copolymers may be random copolymers or block copolymers.

The vinyl monomer to be used in the polymerization of the vinyl polymer (II) is not particularly restricted but includes those mentioned hereinabove. For example, when the vinyl polymer (II) is a (meth)acrylic polymer, (meth) acrylic monomers are preferred, acrylic monomers are more preferred, and acrylic ester monomers having a hydrocarbon group in the ester moiety are still more preferred.

On the other hand, the other vinyl monomer is not particularly restricted but includes vinyl monomers other than the monomer(s) used in the polymerization of the vinyl polymer (II), and vinyl monomers having a polyether structure. In particular, vinyl monomers having a polyether structure are preferred.

The above polyether structure is not particularly restricted but preferably is one comprising the same repeating unit as the repeating unit in the polyether polymer (I) so that the compatibility with the polyether polymer (I) maybe improved. For example, when the main chain of the polyether polymer (I) is essentially polypropylene oxide, it is preferred that the above polyether structure be essentially polypropylene oxide. The number of oxyalkylene units in each polyether structure may greatly vary depending on the average number of polyether structures contained in each molecule but, generally, it is 2 to 20 and, preferably, 2 to 10 in view of ease of synthesis. Furthermore, the terminus of the polyether structure may be a hydroxyl group itself or may be blocked with a lower alkyl group. From the compatibility viewpoint, one blocked with a lower alkyl group is preferred.

The vinyl monomer having a polyether structure is not particularly restricted but includes various species, among which a monomer of the same kind as the monomer constituting the vinyl polymer (II). For example, when the vinyl polymer (II) is a (meth)acrylic polymer, a (meth)acrylic monomer having a polyether structure is preferred. Preferred as such (meth)acrylic monomer having a polyether structure is (meth) acrylic esters having a polyether structure in the ester moiety thereof. More preferred are acrylic acid esters having a polyether structure in the ester moiety thereof. For example, mention may be made of acrylic acid-ethylene oxide adducts, acrylic acid-propylene oxide adducts, and the like.

The proportions, in the compatibilizing agent (III), of the same vinyl monomer as used in the polymerization of the vinyl polymer (II) and the vinyl monomer having a polyether structure may vary greatly depending on the mixing ratio between the polyether polymer (I) and vinyl polymer (II) and/or to the polyether structure. Generally, either monomer preferably accounts for 1 to 99%, more preferably 5% to 95%, of the total number of moles of the monomers constituting the compatibilizing agent (III). In the compatibilizing agent (III), the mole ratio of the same monomer as used in the polymerization of the vinyl polymer (II) to the vinyl monomer having a polyether structure is not particularly restricted but, generally, it is 1:100 to 100:1, preferably 1:20 to 20:1, more preferably 1:10 to 10:1. When the content of the polyether polymer (I) is high, the mole ratio of the vinyl monomer having a polyether structure is preferably increased.

The number average molecular weight of the compatibilizing agent (III) according to the present invention is not particularly restricted but preferably is within the range of 500 to 50,000, more preferably within the range of 1,000 to 10,000, which is determined by gel permeation chromatography. If the molecular weight is lower, the effect as a compatibilizing agent may not be expressed. When the molecular weight is higher, the viscosity may become high, possibly causing handling difficulties.

The method of synthesizing the compatibilizing agent (III) according to the present invention is not particularly restricted but may involve free radical polymerization or controlled radical polymerization. From the viewpoint of various characteristics of curable compositions obtainable, controlled radical polymerization is preferred, living radical polymerization is more preferred, and atom transfer radical polymerization is still more preferred.

<<Compatibilizing Agent (IV)>>

The component (IV) compatibilizing agent to be used according to the invention is a component to be added for compatibilizing the polyether polymer (I) with the vinyl polymer (II) and comprises at least one compound selected from the group consisting of nonpolymer organic compounds, polymers obtainable by polymerizing a monomer(s) other than vinyl monomers, and polymers obtainable by polymerizing a single vinyl monomer.

The nonpolymer organic compounds are not particularly restricted but include, among others, phthalates, such as dibutyl phthalate, diheptyl phthalate, di(2-ethylhexyl) phthalate and butyl benzyl phthalate; nonaromatic dibasic acid esters such as dioctyl adipate, dioctyl sebacate, dibutyl sebacate and isodecyl succinate; aliphatic esters such as butyl oleate and methyl acetylricinoleate; polyalkylene glycol esters such as diethylene glycol dibenzoate, triethylene glycol dibenzoate and pentaerythritol esters; phosphates such as tricresyl phosphate and tributyl phosphate; and trimellitates.

The polymers obtainable by polymerizing a monomer(s) other than vinyl monomers are not particularly restricted but include, among others, chlorinated paraffins; hydrocarbon oils such as alkyldiphenyls and partially hydrogenated terphenyl; process oils; polyether polyols such as polyethylene glycol, polypropylene glycol and polytetramethylene glycol, derivatives of these polyether polyols by conversion of the hydroxyl groups to ester or ether groups, and like polyethers; epoxy plasticizers such as epoxidized soybean oil and benzyl epoxystearate; and polyester plasticizers obtainable from dibasic acids such as sebacic acid, adipic acid, azelaic acid and phthalic acid and dihydric alcohols such as ethylene glycol, diethylene glycol, triethylene glycol, propylene glycol and dipropylene glycol.

The polymers obtainable by polymerizing a single vinyl monomer are not particularly restricted but include, among others, polystyrenes such as polystyrene and poly-α-methylstyrene; polybutadiene, polybutene, polyisobutylene, butadiene-acrylonitrile copolymers, polychloroprene; acrylic plasticizers, and like vinyl polymers obtainable by polymerizing vinyl monomers by various methods.

The above-mentioned acrylic plasticizers are not particularly restricted but include, among others, conventional ones obtainable by solution polymerization and solventless acrylic polymers. The latter acrylic plasticizers are more suited for the purpose of the present invention since they are produced by high-temperature continuous polymerization techniques (U.S. Pat. No. 4,414,370, Japanese Kokai Publication Sho-59-6207, Japanese Kokoku Publication Hei-05-58005, Japanese Kokai Publication Hei-01-313522, U.S. Pat. No. 5,010,166), without using any solvent or chain transfer agent. Examples thereof are not particularly restricted but include, among others, UP series products (Toagosei Co., Ltd.)(cf. Kogyo Zairyo (Magazine for Engineering Materials), October 1999 issue).

When the polymer obtainable by polymerizing a single vinyl monomer is used as the compatibilizing agent, the molecular weight thereof is not particularly restricted but preferably is not more than 3,000 from the compatibility viewpoint. The main chain thereof is not particularly restricted but preferably is a polyolefin. A polyoxyalkylene is also preferred, and polypropylene oxide is more preferred.

The content of the compatibilizing agent (IV) is preferably 1 to 200 parts by weight, more preferably 5 to 150 parts by weight, most preferably 10 to 100 parts by weight, relative to 100 parts by weight of the sum of the polyether polymer (I) and vinyl polymer (II).

<<Curable Composition>>

In the curable composition of the present invention, a curing catalyst and/or a curing agent may be required according to the curable functional group species. Any of various compounding additives or ingredients may be added thereto according to the physical properties required.

<Curing Catalyst, Curing Agent>

In the Case of Crosslinkable Silyl Groups

The crosslinkable silyl group-containing polymer is crosslinked and cured under siloxane bond formation in the presence or absence of various condensing catalysts known in the art. The properties of the cured products can widely range from rubber-like to resinous ones according to the molecular weight and main chain skeleton of the polymer.

As examples of such condensing catalyst, there may be mentioned, among others, tetravalent tin compounds such as dibutyltin dilaurate, dibutyltin phthalate, dibutyltin bisacetylacetonate, dibutyltin diacetate, dibutyltin diethylhexanoate, dibutyltin dioctoate, dibutyltin di (methyl maleate), dibutyltin di(ethyl maleate), dibutyltin di(butyl maleate), dibutyltin di(isooctyl maleate), dibutyltin di(tridecyl maleate), dibutyltin di(benzyl maleate), dibutyltin maleate, dioctyltin diacetate, dioctyltin distearate, dioctyltin dilaurate, dioctyltin di(ethyl maleate), dioctyltin di(isooctyl maleate), dibutyltin dimethoxide, dibutyltin bis-nonylphenoxide and dibutenyltin oxide; divalent tin compounds such as stannous octylate, stannous naphthenate and stannous stearate; titanate esters such as tetrabutyl titanate and tetrapropyl titanate; organoaluminum compounds such as aluminum trisacetylacetonate, aluminum tris(ethyl acetoacetate) and diisopropoxyaluminum ethyl acetoacetate; chelate compounds such as zirconium tetraacetylacetonate and titanium tetraacetylacetoante; lead octylate; amine compounds such as butylamine, octylamine, laurylamine, dibutylamine, monoethanolamine, diethanolamine, triethanolamine, diethylenetriamine, triethylenetetramine, oleylamine, cyclohexylamine, benzylamine, diethylaminopropylamine, xylylenediamine, triethylenediamine, guanidine, diphenylguanidine, 2,4,6-tris (dimethylaminomethyl)phenol, morpholine, N-methylmorpholine, 2-ethyl-4-methylimidazole and 1,8-diazabicyclo[5.4.0]undecene-7 (DBU), or salts of these amine compounds with carboxylic acids; amine compound-organotin compound reaction products and mixtures, for example laurylamine-stannous octylate reaction products or mixtures; low-molecular-weight polyamide resins obtainable from a polyamine in excess and a polybasic acid; reaction products from a polyamine in excess and an epoxy compound; amino group-containing silane coupling agents such as γ-aminopropyltrimethoxysilane and N-(β-aminoethyl)aminopropylmethyldimethoxysilane; and like silanol condensation catalysts and, further, other known silanol condensation catalysts such as acidic catalysts and basic catalysts.

These catalysts may be used singly or two or more of them may be used in combination. The level of addition of such condensation catalyst is preferably about 0.1 to 20 parts (by weight; hereinafter the same shall apply), more preferably 1 to 10 parts, per 100 parts of the vinyl polymer (II) having at least one crosslinkable silyl group. When the addition level of the silanol condensing catalyst is below the above range, the rate of curing may fall and the curing can hardly proceed to a satisfactory extent in certain cases. Conversely, when the level of addition of the silanol condensation catalyst exceeds the above range, local heat generation and/or foaming may occur in the step of curing, making it difficult to obtain good cured products; in addition, the pot life becomes excessively short and this is unfavorable from the workability viewpoint as well.

For further increasing the activity of the condensation catalyst in the curable composition of the present invention, a silanol group-free silicon compound represented by the general formula 40:

$$(R^{49})_a Si(OR^{50})_{4-a} \qquad (40)$$

wherein $R^{49}$ and $R^{50}$ each independently is a substituted or unsubstituted hydrocarbon group containing 1 to 20 carbon atoms and a is 0, 1, 2 or 3, may be added to the composition.

The above silicon compound is not restricted but those compounds of the general formula (40) in which $R^{49}$ is an aryl group containing 6 to 20 carbon atoms, such as phenyltrimethoxysilane, phenylmethyldimethoxysilane, phenyldimethylmethoxysilane, diphenyldimethoxysilane, diphenyldiethoxysilane and triphenylmethoxysilane, are preferred since their accelerating effect on the curing reaction of the composition is significant. In particular, diphenyldimethoxysilane and diphenyldiethoxysilane are low in cost and readily available, hence are most preferred.

The level of addition of this silicon compound is preferably about 0.01 to 20 parts, more preferably 0.1 to 10 parts, per 100 parts of the vinyl polymer (II) having at least one crosslinkable silyl group. When the level of addition of the silicon compound is below this range, the curing reaction-accelerating effect may decrease in certain cases. When, conversely, the level of addition of the silicon compound exceeds this range, the hardness and/or tensile strength of the cured products may fall.

In the Case of Alkenyl Groups

When alkenyl groups are associated in the crosslinking, it is preferred, though not obligatory, that the crosslinking be effected in the manner of hydrosilylation using a hydrosilyl group-containing compound as a curing agent, together with a hydrosilylation catalyst.

The hydrosilyl group-containing compound is not particularly restricted but may be any of various hydrosilyl group-containing compounds which can cure with the alkenyl-containing polymer by crosslinking. For example, use may be made of linear polysiloxanes represented by the general formula 41 or 42:

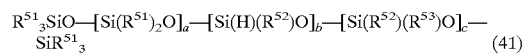

$$R^{51}{}_3SiO-[Si(R^{51})_2O]_a-[Si(H)(R^{52})O]_b-[Si(R^{52})(R^{53})O]_c-SiR^{51}{}_3 \qquad (41)$$

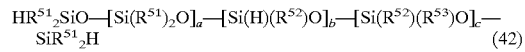

$$HR^{51}{}_2SiO-[Si(R^{51})_2O]_a-[Si(H)(R^{52})O]_b-[Si(R^{52})(R^{53})O]_c-SiR^{51}{}_2H \qquad (42)$$

wherein $R^{51}$ and $R^{52}$ each represents an alkyl group containing 1 to 6 carbon atoms or a phenyl group, $R^{53}$ represents an alkyl group or aralkyl group containing 1 to 10 carbon atoms, and a, b and c each represents an integer satisfying the relations $0 \leq a \leq 100$, $2 \leq b \leq 100$ or $0 \leq c \leq 100$);

cyclic siloxanes represented by the general formula 43:

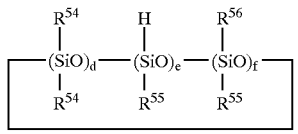
(43)

wherein $R^{54}$ and $R^{55}$ each represents an alkyl group containing 1 to 6 carbon atoms or a phenyl group, $R^{56}$ represents an alkyl group or aralkyl group containing 1 to 10 carbon atoms, and d, e and f each represents an integer satisfying the relations $0 \leq d \leq 8$, $2 \leq e \leq 10$ or $0 \leq f \leq 8$ provided that the relation $3 \leq d+e+f \leq 10$ should be satisfied; and like compounds.

These may be used singly or two or more of them may be used in admixture. Among these siloxanes, phenyl-containing linear siloxanes represented by the general formula 44 or 45 shown below and cyclic siloxanes represented by the general formula 46 or 47 shown below are preferred from the viewpoint of compatibility with the (meth)acrylic polymers.

$(CH_3)_3SiO\text{—}[Si(H)(CH_3)O]_g\text{—}[Si(C_6H_5)_2O]_h\text{—}Si(CH_3)_3$ (44)

$(CH_3)_3SiO\text{—}[Si(H)(CH_3)O]_g\text{—}[Si(CH_3(CH_2C(H)(R^{57})C_6H_5]O)_h\text{—}Si(CH_3)_3$ (45)

(In the above formulas, $R^{57}$ represents a hydrogen atom or a methyl group, g and h each represents an integer satisfying the relation $2 \leq g \leq 100$ or $0 \leq h \leq 100$, and $C_6H_5$ represents a phenyl group.)

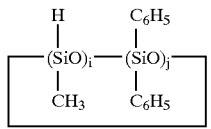
(46)

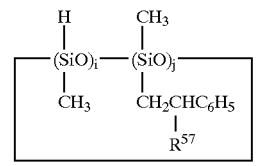
(47)

(In the above formulas, $R^{57}$ represents a hydrogen atom or a methyl group, i and j each represents an integer satisfying the relation $2 \leq i \leq 10$ or $0 \leq j \leq 8$ provided that the relation $3 \leq i+j \leq 10$ should be satisfied; and $C_6H_5$ represents a phenyl group.)

Further usable as the hydrosilyl-containing compound are compounds obtainable by subjecting a low-molecular-weight compound having two or more alkenyl groups in each molecule and a hydrosilyl-containing compound represented by any of the general formulas 41 to 47 to addition reaction in a manner such that the hydrosilyl group partially remains even after reaction. Usable as the compound having two or more alkenyl groups in the molecule are various compounds, for example hydrocarbon compounds such as 1,4-pentadiene, 1,5-hexadiene, 1,6-heptadiene, 1,7-octadiene, 1,8-nonadiene and 1,9-decadiene, ether compounds such as O,O'-diallylbisphenol A and 3,3'-diallylbisphenol A, ester compounds such as diallyl phthalate, diallyl isophthalate, triallyl trimellitate and tetraallyl pyromellitate, and carbonate compounds such as diethylene glycol diallyl carbonate.

The above compounds can be obtained by slowly adding dropwise the alkenyl-containing compound to an excess of the hydrosilyl-containing compound represented by one of the general formulas 41 to 47 shown above in the presence of a hydrosilylation catalyst. Among such compounds, the following ones are preferred in view of the readily availability of raw materials, the ease of removal of the siloxane used in excess and, further, the compatibility with the (I) and/or (II) component polymer:

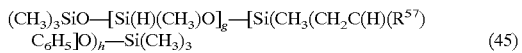
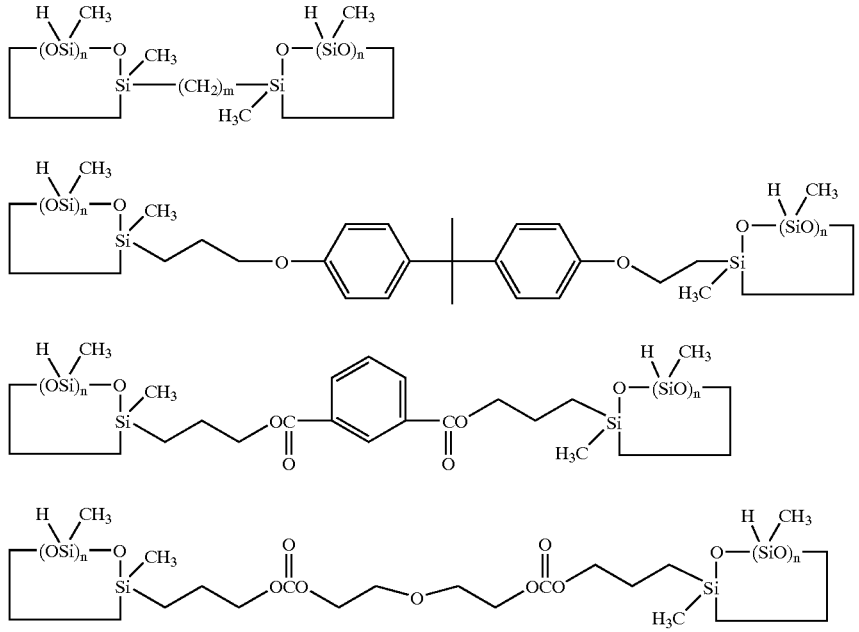

(n being an integer of 2 to 4 and m being an integer of 5 to 10).

The polymer and curing agent may be mixed together in an arbitrary ratio but, from the curability viewpoint, the mole ratio between the alkenyl and hydrosilyl groups is preferably within the range of 5 to 0.2, more preferably within the range of 2.5 to 0.4. When the mole ratio is above 5, the curing becomes insufficient and only cured products having surface tack and low strength can be obtained. When it is lower than 0.2, the active hydrosilyl group remains in large amounts in the cured products even after curing, so that cracks and voids appear and no uniform and strong cured products can be obtained.

The curing reaction between the polymer and curing agent proceeds when the two components are mixed up and heated. For causing the reaction to proceed more rapidly, a hydrosilylation catalyst may be added. Such hydrosilylation catalyst is not particularly restricted but may be, for example, a radical initiator such as an organic peroxide or azo compound, or a transition metal catalyst.

The radical initiator is not particularly restricted but includes, among others, dialkyl peroxides such as di-t-butyl peroxide, 2,5-dimethyl-2,5-di(t-butylperoxy)hexane, 2,5-dimethyl-2,5-di(t-butylperoxy)-3-hexyne, dicumyl peroxide, t-butyl cumyl peroxide and $\alpha$, $\alpha'$-bis(t-butylperoxy)isopropylbenzene, diacyl peroxides such as benzoyl peroxide, p-chlorobenzoyl peroxide, m-chlorobenzoyl peroxide, 2,4-dichlorobenzoyl peroxide and lauroyl peroxide, peroxy esters such as t-butyl perbenzoate, peroxydicarbonates such as diisopropyl peroxydicarbonate and di-2-ethylhexyl peroxydicarbonate, peroxy ketals such as 1,1-di(t-butylperoxy)cyclohexane and 1,1-di(t-butylperoxy)-3,3,5-trimethylcyclohexane, and the like.

The transition metal catalyst is not particularly restricted, either, but includes, among others, simple substance platinum, solid platinum dispersed on/in a carrier such as alumina, silica or carbon black, chloroplatinic acid, chloroplatinic acid complexes with alcohols, aldehydes, ketones or the like, platinum-olefin complexes, and platinum(0)-divinyltetramethyldisiloxane complex. As other catalysts than platinum compounds, there may be mentioned RhCl (PPh$_3$)$_3$, RhCl$_3$, RuCl$_3$, IrCl$_3$, FeCl$_3$, AlCl$_3$, PdCl$_2$.H$_2$O, NiCl$_2$ and TiCl$_4$, for instance. These catalysts may be used singly or two or more of them may be used in combination. The amount of the catalyst is not particularly restricted but recommendably is within the range of $10^{-1}$ to $10^{-8}$ mole, preferably $10^{-3}$ to $10^{-6}$ mole, per mole of the alkenyl group in the vinyl polymer (II). When it is less than $10^{-8}$ mole, the curing will not proceed to a sufficient extent. Since the hydrosilylation catalyst is expensive, it is preferred that it be not used in an amount exceeding $10^{-1}$ mole.

The curing temperature is not particularly restricted but, recommendably, the curing is carried out generally at 0° C. to 200° C., preferably at 30° C. to 150° C., more preferably at 80° C. to 150° C.

In the Case of Hydroxyl Group

The hydroxyl-containing polymer according to the invention can be cured uniformly by using, as a curing agent, a compound having two or more functional groups capable of reacting with the hydroxyl group. As specific examples of the curing agent, there may be mentioned, among others, polyvalent isocyanate compounds having two or more isocyanato groups in each molecule, aminoplast resins such as methylolated melamine and alkyl-etherification derivatives thereof or low condensation products thereof, and polyfunctional carboxylic acids and halogenation derivatives thereof.

When cured products are to be produced by using these curing agents, appropriate curing catalysts can be used for the respective curing agents.

In the Case of Amino Groups

The amino group-containing polymer according to the present invention can be cured uniformly by using, as a curing agent, a compound having two or more functional groups capable of reacting with the amino group(s). As specific examples of the curing agent, there may be mentioned, among others, polyvalent isocyanate compounds having two or more isocyanato groups in each molecule, aminoplast resins such as methylolated melamine and alkyl-etherification derivatives thereof or low condensation products thereof, and polyfunctional carboxylic acids and halogenation derivatives thereof. When cured products are to be produced by using these curing agents, appropriate curing catalysts can be used for the respective curing agents.

In the Case of Epoxy Group

The curing agent to be used for the epoxy-containing polymer according to the invention is not particularly restricted. Usable as such are, for example, aliphatic amines, alicyclic amines, aromatic amines; acid anhydrides; polyamides; imidazoles; amineimides; urea; melamine and derivatives thereof; polyamine salts; phenol resins: polymercaptans, polysulfides; and photocuring/ultraviolet curing agents such as aromatic diazonium salts, diallyliodonium salts, triallylsulfonium salts and triallylselenium salts.

In the Case of Polymerizable Carbon-Carbon Double Bonds

The polymerizable carbon-carbon double bond-containing polymer can be crosslinked through the polymerization reaction of its polymerizable carbon-carbon double bond(s).

The method of crosslinking includes curing with activating energy rays, and curing by means of heat. In the activating energy ray-curable composition, the photopolymerization initiator is preferably a photoradical initiator or a photoanion initiator. In thermocurable compositions, the heat polymerization initiator is preferably selected from the group consisting of azo initiators, peroxides, persulfates, and redox initiator systems.

In the following, these crosslinking reactions are described in detail.

When the polymerizable carbon-carbon double bond-containing polymer is to be crosslinked, a polymerizable monomer and/or oligomer and/or various additives may be combinedly used according to the intended purpose. Preferred as the polymerizable monomer and/or oligomer are monomers and/or oligomers having a radical-polymerizable group or an anionically polymerizable group. The radical-polymerizable group includes acrylic functional groups such as a (meth)acrylic group, styrene group, acrylonitrile group, vinyl ester group, N-vinylpyrrolidone group, acrylamide group, conjugated diene group, vinyl ketone group, vinyl chloride group, etc. Among them, those having a (meth) acrylic group similar to the polymer of the invention are preferred. The anionically polymerizable group includes a (meth) acrylic group, styrene group, acrylonitrile group, N-vinylpyrrolidone group, acrylamide group, conjugated diene group, vinyl ketone group, etc. Among them, those having an acrylic functional group are preferred.

As specific examples of the above monomer, there may be mentioned (meth)acrylate monomers, cyclic acrylates, N-vinylpyrrolidone, styrenic monomers, acrylonitrile, N-vinylpyrrolidone, acrylamide monomers, conjugated diene monomers, vinyl ketone monomers, etc. As the (meth) acrylate monomers, there may be mentioned n-butyl (meth) acrylate, 2-ethylhexyl (meth)acrylate, isooctyl (meth)

acrylate, isononyl (meth)acrylate, and compounds of the following formulas:

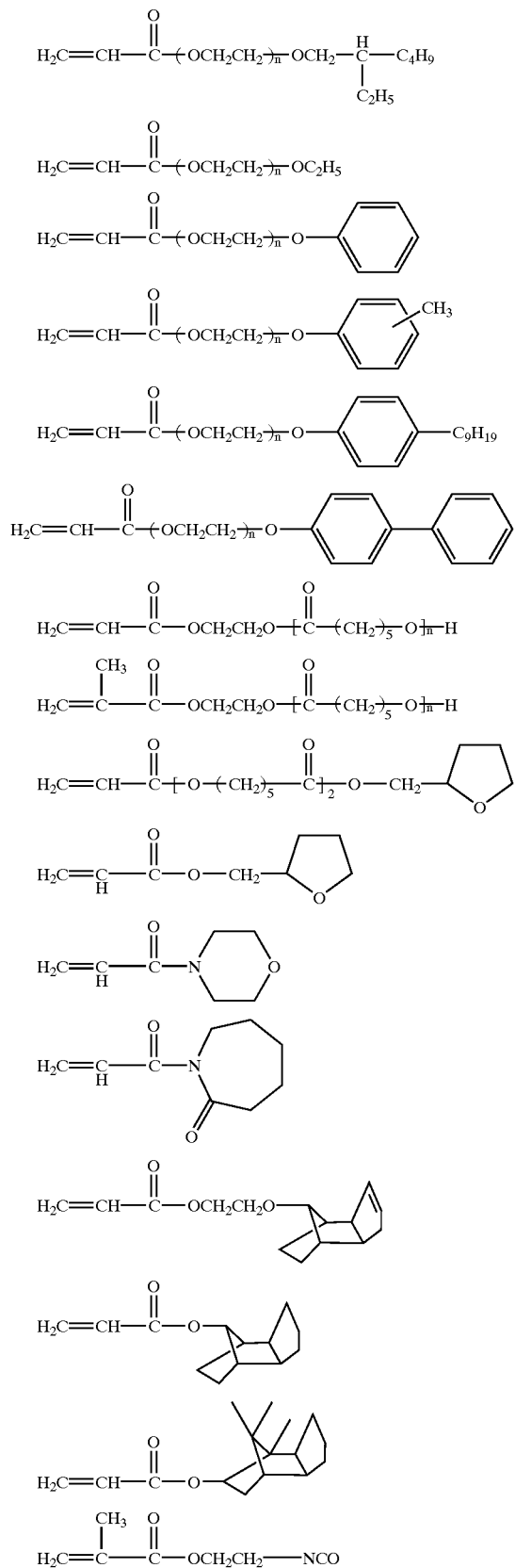

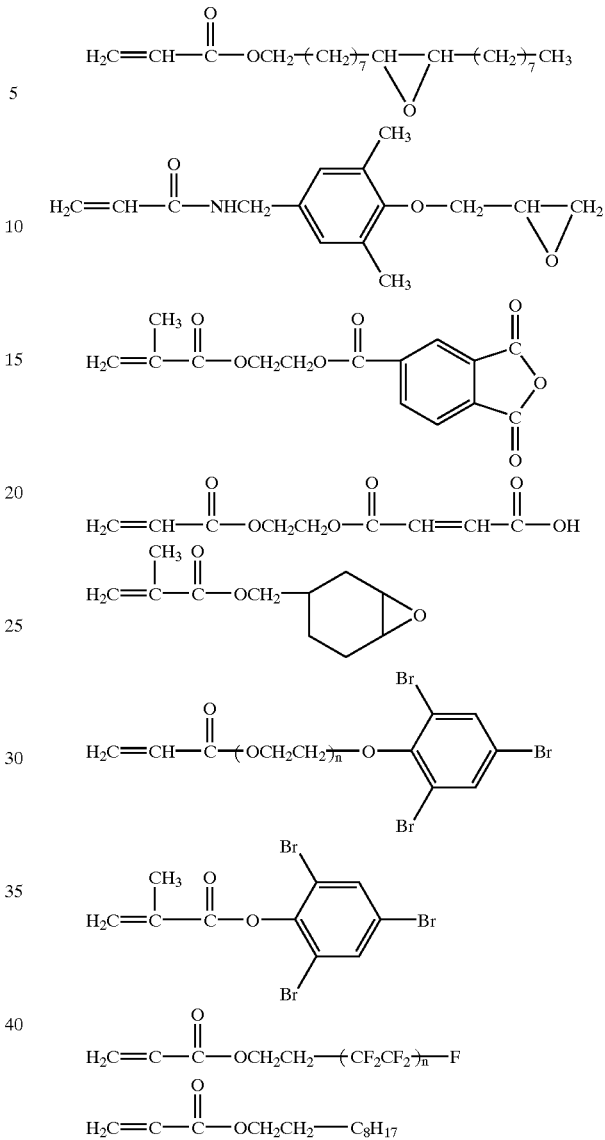

The styrenic monomers include styrene, α-methylstyrene, and the like, the acrylamide monomers include acrylamide, N,N-dimethylacrylamide, and the like, the conjugated diene monomers include butadiene, isoprene, and the like, and the vinyl ketone monomers include methyl vinyl ketone and the like.

As the polyfunctional monomers, there may be mentioned neopentyl glycol polypropoxy diacrylate, trimethylolpropane polyethoxy triacrylate, bisphenol F polyethoxy diacrylate, bisphenol A polyethoxy diacrylate, dipentaerythritol polyhexanolide hexaacrylate, tris(hydroxyethyl) isocyanurate polyhexanolide triacrylate, tricyclodecanedimethylol diacrylate, 2-(2-acryloyloxy-1,1-dimethyl)-5-ethyl-5-acryloyloxymethyl-1,3-dioxane, tetrabromobisphenol A diethoxy diacrylate, 4,4'-dimercaptodiphenyl sulfide dimethacrylate, polytetraethylene glycol diacrylate, 1,9-nonandiol diacrylate, ditrimethylolpropane tetraacrylate, etc.

As the oligomers, there may be mentioned bisphenol A-based epoxy acrylate resins, phenol novolak-based epoxy acrylate resins, cresol novolak-based epoxy acrylate resins and like epoxy acrylate resins, COOH-modified epoxy acrylate resins, urethane acrylate resins obtainable by reacting urethane resins prepared from a polyol (e.g. polytetramethylene glycol, polyester diol derived from ethylene glycol and adipic acid, ε-caprolactone-modified polyester diol, polypropylene glycol, polyethylene glycol, polycarbonate diol, hydroxyl-terminated hydrogenated polyisoprene, hydroxyl-terminated polybutadiene, hydroxyl-terminated polyisobutylene, etc.) and an organic isocyanate (e.g. tolylene diisocyanate, isophoronediisocyanate, diphenylmethanediisocyanate, hexamethylene diisocyanate, xylylene diisocyanate) with a hydroxyl-containing (meth) acrylate {e.g. hydroxyethyl (meth)acrylate, hydroxypropyl (meth)acrylate, hydroxybutyl (meth)acrylate, pentaerythritol triacrylate}, resins derived from the above-mentioned polyol by introduction of a (meth)acrylic group via ester bonding, polyester acrylate resins, and so forth.

An appropriate one is to be selected from among these monomers and oligomers according to the initiator and curing conditions employed.

It is preferred for good compatibility reasons that the acrylic functional group-containing monomer and/or oligomer have a number average molecular weight of not higher than 2,000, more preferably not higher than 1,000.

As for the method of crosslinking the polymerizable carbon-carbon double bond-containing polymer, the use of UV or electron beams or like activating energy rays is preferred.

When crosslinking is to be accomplished by means of activating energy rays, it is preferred that the composition contain a photopolymerization initiator.

The photopolymerization initiator to be used in the practice of the invention is not particularly restricted but preferably is a photoradical initiator or photoanion initiator, in particular a photoradical initiator. As examples, there may be mentioned acetophenone, propiophenone, benzophenone, xanthol, fluorenone, benzaldehyde, anthraquinone, triphenylamine, carbazole, 3-methylacetophenone, 4-methylacetophenone, 3-pentylacetophenone, 4-methoxyacetophenone, 3-bromoacetophenone, 4-allylacetophenone, p-diacetylbenzene, 3-methoxybenzophenone, 4-methylbenzophenone, 4-chlorobenzophenone, 4,4'-dimethoxybenzophenone, 4-chloro-4'-benzylbenzophenone, 3-chloroxanthone, 3,9-dichloroxanthone, 3-chloro-8-nonylxanthone, benzoil, benzoin methyl ether, benzoin butyl ether, bis(4-dimethylaminophenyl) ketone, benzyl methoxy ketal, 2-chlorothioxanthone, and the like. These initiators may be used singly or in combination with another compound. More specifically, mention may be made of combinations with amines such as diethanolmethylamine, dimethylethanolamine and triethanolamine, optionally further combined with an iodonium salt such as diphenyliodonium chloride, and combinations with a dye, such as Methylene Blue, and an amine.

Further, a near infrared-absorbing cationic dye may also be used as a near infrared photopolymerization initiator. The near infrared-absorbing cationic dye to be used is preferably a near infrared-absorbing cationic dye-borate anion complex capable of being excited by light energy in the region of 650 to 1,500 nm, such as one disclosed in Japanese Kokai Publication Hei-03-111402 or Japanese Kokai Publication Hei-05-194619, for instance. The combined use of a boron-containing sensitizer is more preferred.

The level of addition of the photopolymerization initiator is such that the system can be photofunctionalized only slightly; hence it is not particularly restricted. Preferably, however, the level is 0.001 to 10 parts by weight per 100 parts of the polymer in the composition.

The method of curing the activating energy ray-curable composition of the present invention is not particularly restricted but may involve irradiation with light rays or electron beams using a high-pressure mercury lamp, low-pressure mercury lamp, electron beam irradiation equipment, halogen lamp, light emitting diode, semiconductor laser, etc. according to the characteristics of the photopolymerization initiator.

As for the method of crosslinking the polymerizable carbon-carbon double bond-containing polymer, the use of heat is preferred.

In effecting the crosslinking by means of activating energy rays, it is preferred that the composition contain a heat polymerization initiator.

The heat polymerization initiator to be used in the practice of the present invention is not particularly restricted but includes azo initiators, peroxides, persulfate salts, and redox initiator systems.

Suitable azo initiators include, but are not limited to, 2,2'-azobis(4-methoxy-2,4-dimethylvaleronitrile)(VAZO 33), 2,2'-azobis(2-amidinopropane) dihydrochloride (VAZO 50), 2,2'-azobis(2,4-dimethylvaleronitrile)(VAZO 52), 2,2'-azobis(isobutyronitrile)(VAZO 64), 2,2'-azobis-2-methylbutyronitrile (VAZO 67), 1,1-azobis(1-cyclohexanecarbonitrile)(VAZO 88)(all available from DuPont Chemical), 2,2'-azobis(2-cyclopropylpropionitrile), and 2,2'-azobis (methyl isobutyrate)(V-601)(available from Wako Pure Chemical Industries), among others.

Appropriate peroxide initiators include, but are not limited to, benzoylperoxide, acetylperoxide, lauroylperoxide, decanoyl peroxide, dicetyl peroxydicarbonate, di(4-t-butylcyclohexyl) peroxydicarbonate (Perkadox 16S) (available from Akzo Nobel), di(2-ethylhexyl) peroxydicarbonate, t-butyl peroxypivalate (Lupersol 11) (available from Elf Atochem), t-butyl peroxy-2-ethylhexanoate (Trigonox 21-C50)(available from Akzo Nobel) and dicumyl peroxide, among others.

Appropriate persulfate initiators include, but are not limited to, potassium persulfate, sodium persulfate and ammonium persulfate, among others.

Suitable redox (oxidation/reduction) initiators include, but are not limited to, combinations of the above-mentioned persulfate initiators and a reducing agent such as sodium metabisulfite or sodium hydrogen sulfite; systems based on an organic peroxide and a tertiary amine, such as the system based on benzoyl peroxide and dimethylaniline; and systems based on an organic hydroperoxide and a transition metal, such as the system based on cumene hydroperoxide and cobalt naphthenate.

Other initiators include, but are not limited to, pinacols, such as tetraphenyl-1,1,2,2-ethanediol.

Preferred heat radical initiators are selected from the group consisting of azo initiators and peroxide initiators. More preferred ones are 2,2'-azobis(methyl isobutyrate), t-butyl peroxypivalate and di(4-t-butylcyclohexyl) peroxydicarbonate, and mixtures of these.

When used in the present invention, the heat initiator is present in a catalytically effective amount, and such amount is not restricted but, typically, is about 0.01 to 5 parts by weight, preferably about 0.025 to 2 parts by weight, per 100 parts by weight of the total amount of the polymer according to the invention, which has at least one terminal acrylic functional group, and the additional monomer and oligomer mixture. When a mixture of initiators is used, the total amount of the initiator mixture is selected as if only one initiator were used.

The method of curing the heat-curable composition of the invention is not particularly restricted. However, the temperature depends on the heat initiator used, the polymer (II), and the compound(s) added, among others. Generally, it is preferably within the range of 50° C. to 250° C., more preferably within the range of 70° C. to 200° C. The curing time depends, among others, on the polymerization initiator, monomer(s), solvent and reaction temperature employed but, generally, it is within the range of about 1 minute to 10 hours.

<Adhesive Property Providing Agent>

In the composition of the present invention, there may be incorporated a silane coupling agent and/or an adhesive property providing agent other than the silane coupling agent. By adding such an adhesive property providing agent, it becomes possible to reduce the risk of the sealing material peeling off from adherends such as siding boards due to changes in joint width as caused by an eternal force. Further, it becomes no more necessary in certain cases to use a primer for improving the adhesiveness, whereby the laying operation can be expected to be simplified. As specific examples of the silane coupling agent, there may be mentioned isocyanato group-containing silanes such as γ-isocyanatopropyltrimethoxysilane, γ-isocyanatopropyltriethoxysilane, γ-isocyanatopropylmethyldiethoxysilane and γ-isocyanatopropylmethyldimethoxysilane; amino group-containing silanes such as γ-aminopropyltrimethoxysilane, γ-aminopropyltriethoxysilane, γ-aminopropylmethyldimethoxysilane, γ-aminopropylmethyldiethoxysilane, γ-(2-aminoethyl)aminopropyltrimethoxysilane, γ-(2-aminoethyl)aminopropylmethyldimethoxysilane, γ-(2-aminoethyl)aminopropyltriethoxysilane, γ-(2-aminoethyl)aminopropylmethyldiethoxysilane, γ-ureidopropyltrimethoxysilane, N-phenyl-γ-aminopropyltrimethoxysilane, N-benzyl-γ-aminopropyltrimethoxysilane and N-vinylbenzyl-γ-aminopropyltriethoxysilane; mercapto group-containing silanes such as γ-mercaptopropyltrimethoxysilane, γ-mercaptopropyltriethoxysilane, γ-mercaptopropylmethyldimethoxysilane and γ-mercaptopropylmethyldiethoxysilane; epoxy group-containing silanes such as γ-glycidoxypropyltrimethoxysilane, γ-glycidoxypropyltriethoxysilane, γ-glycidoxypropylmethyldimethoxysilane, β-(3,4-epoxycyclohexyl)ethyltrimethoxysilane and β-(3,4-epoxycyclohexyl)ethyltriethoxysilane; carboxysilanes such as β-carboxyethyltriethoxysilane, β-carboxyethylphenylbis (2-methoxyethoxy)silane and N-β-(carboxymethyl) aminoethyl-γ-aminopropyltrimethoxysilane, vinyl type unsaturated group-containing silanes such as vinyltrimethoxysilane, vinyltriethoxysilane, γ-methacryloyloxypropylmethyldimethoxysilane and γ-acryloxyloxypropylmethyltriethoxysilane; halogen-containing silanes such as γ-chloropropyltrimethoxysilane; and isocyanurate silanes such as tris(trimethoxysilyl) isocyanurate. Also usable as the silane coupling agent are modified derivatives of these, for example amino-modified silyl polymers, silylated amino polymers, unsaturated amino silane complexes, phenylamino-long chain alkylsilanes, aminosilylated silicones and silylated polyesters.

In the practice of the invention, the silane coupling agent is used generally in an amount within the range of 0.1 to 20 parts per 100 parts of the polyether polymer (I) plus vinyl polymer (II). In particular, the use thereof within the range of 0.5 to 10 parts is preferred. If the addition level is excessively high, the cured products obtainable by curing the resulting curable composition may not have the desired rubber elasticity any longer, hence they can no longer function as a sealing material in certain instances. When it is added to a two-component system, as mentioned later herein, it is preferred that the sum of the amounts added to both components be within the range mentioned above. As for the effect of the silane coupling agent added to the curable composition of the present invention, it produces marked adhesive property improving effects under non-primer or primer-treated conditions when the composition is applied to various adherend materials, namely inorganic materials such as glass, aluminum, stainless steel, zinc, copper and mortar, or organic materials such as polyvinyl chloride, acrylics, polyesters, polyethylene, polypropylene and polycarbonates. When it is used under non-primer conditions, the improving effects on the adhesion to various adherends are particularly remarkable.

Specific examples of the agent other than the silane coupling agent include, but are not particularly limited to, epoxy resins, phenol resins, sulfur, alkyl titanates and aromatic polyisocyanates, among others.

The adhesive property providing agents specifically mentioned above may be used singly or two or more of them may be used in admixture. By adding these adhesive property providing agents, it is possible to improve the adhesion to adherends.

<Plasticizers>

If necessary, any of various plasticizers may be used in the curable composition of the present invention. Such plasticizer is not particularly restricted but, according to the purpose of addition, for example adjustment of physical properties and/or modification of other properties, use can be made of one or a mixture of two or more of phthalate esters such as dibutyl phthalate, diheptyl phthalate, di(2-ethylhexyl) phthalate and butyl benzyl phthalate; nonaromatic dibasic carboxylic acid esters such as dioctyl adipate, dioctyl sebacate, dibutyl sebacate and isodecyl succinate; aliphatic esters such as butyl oleate and methyl acetylricinolate; polyalkylene glycol esters such as diethylene glycol dibenzoate, triethylene glycol dibenzoate and pentaerythritol esters; phosphate esters such as tricresyl phosphate and tributyl phosphate; trimellitates; polystyrenes such as polystyrene and poly-α-methylstyrene; polybutadiene, polybutene, polyisobutylene, butadiene-acrylonitrile copolymers, polychloroprene; chlorinated paraffins; hydrocarbon oils such as alkyldiphenyls and partially hydrogenated terphenyl; process oils; polyethers such as polyethylene glycol, polypropylene glycol, polytetramethylene glycol and like polyether polyols and derivatives of these polyether polyols as resulting from conversion of hydroxyl groups thereof to ester, ether and/or like groups; epoxy plasticizers such as epoxidized soybean oil and benzyl epoxystearate; polyester plasticizers obtainable from a dibasic acid, such as sebacic acid, adipic acid, azelaic acid or phthalic acid, and a dihydric alcohol, such as ethylene glycol, diethylene glycol, triethylene glycol, propylene glycol or dipropylene glycol; and vinyl polymers obtainable by polymerizing a vinyl monomer(s) by various methods, typically acrylic plasticizers, among others, although these are not always necessary. It is also possible to incorporate these plasticizers in the process of polymer production.

The above-mentioned acrylic plasticizers are not particularly restricted but include, among others, conventional ones obtainable by solution polymerization and solventless acrylic polymers. The latter acrylic plasticizers are more suited for the purpose of the present invention since they are produced by high-temperature continuous polymerization techniques (U.S. Pat. No. 4,414,370, Japanese Kokai Publication Sho-59-6207, Japanese Kokoku Publication Hei-05-58005, Japanese Kokai Publication Hei-01-313522, U.S. Pat. No. 5,010,166), without using any solvent or chain transfer agent. Examples thereof are not particularly restricted but include, among others, UP series products (Toagosei Co, Ltd.)(cf. Kogyo Zairyo (Magazine for Engineering Materials), October 1999 issue).

The level of addition of the plasticizer, when this is used, is not particularly restricted but generally is 5 to 150 parts by weight, preferably 10 to 120 parts by weight, more preferably 20 to 100 parts by weight, per 100 parts by weight of the sum of the polyether polymer (I) and vinyl polymer (II). At levels below 5 parts by weight, the effects as the plasticizer are no more produced and, at levels above 150 parts by weight, the mechanical strength of the cured products becomes insufficient.

<Fillers>

If necessary, any of various fillers may be used in the curable composition of the present invention. The filler is not particularly restricted but includes, among others, reinforcing fillers such as wood flour, pulp, cotton chips, asbestos, glass fibers, carbon fibers, mica, walnut shell flour, rice hull flour, graphite, diatomaceous earth, terra alba, fumed silica, precipitated silica, crystalline silica, fused silica, dolomite, silicic anhydride, hydrous silicic acid and carbon black; fillers such as heavy calcium carbonate, colloidal calcium carbonate, magnesium carbonate, diatomaceous earth, calcined clay, clay, talc, titanium oxide, bentonite, organic bentonite, ferric oxide, aluminum fine particle, flint powder, zinc oxide, activated zinc white, powdered zinc and Shirasu balloons; and fibrous fillers such as asbestos, and glass fibers or filaments. Preferred among these fillers are precipitated silica, fumed silica, crystalline silica, fused silica, dolomite, carbon black, calcium carbonate, titanium oxide, talc and the like. In particular when high strength cured products are to be obtained using these fillers, a filler selected from among fumed silica, precipitated silica, silicic anhydride, hydrous silicic acid, carbon black, surface-treated fine calcium carbonate, crystalline silica, fused silica, calcined clay, clay and activated zinc white, among others, may be mainly added.

When low-strength high-elongation cured products are desired, a filler selected from among titanium oxide, calcium carbonate, talc, ferric oxide, zinc oxide and Shirasu balloons may be mainly added. Generally, when its specific surface area is small, calcium carbonate may fail to produce sufficient improving effects on the breaking strength, elongation at break, adhesiveness and weather-resistant adhesion of cured products. With the increasing specific surface area, its improving effects on the breaking strength, elongation at break, adhesiveness and weather-resistant adhesion of cured products increase.

Further, those species of calcium carbonate which have been surface-treated with a surface-finishing agent are more preferred. When surface-treated calcium carbonate is used, the workability of the curable composition of the present invention and the improving effects on the adhesiveness and weather-resistant adhesion of the curable composition are expected to be improved as compared with the use of non-surface-treated calcium carbonate. Usable as the above surface-treating agent are organic materials or various surfactants, such as fatty acids, fatty acid soaps and fatty acid esters, and various coupling agents, such as silane coupling agents and titanate coupling agents. Specific examples include, but are not limited to, fatty acids such as caproic acid, caprylic acid, pelargonic acid, capric acid, undecanoic acid, lauric acid, myristic acid, palmitic acid, stearic acid, behenic acid and oleic acid, the sodium, potassium or like salts of such fatty acids, and alkyl esters of such fatty acids. Typical examples of the surfactants are sulfate ester type anionic surfactants such as polyoxyethylene alkyl ether sulfate esters and long-chain alcohol sulfates and the sodium, potassium or like salts thereof, and sulfonic acid type anionic surfactants such as alkylbenzenesulfonic acids, alkylnapthalenesulfonic acids, paraffinsulfonic acids, α-olefinsulfonic acids, alkylsulfosuccinic acids and the like and the sodium, potassium or like salts thereof. This surface-finishing agent is used in the treatment preferably in an amount within the range of 0.1 to 20% by weight, more preferably within the range of 1 to 5% by weight, relative to calcium carbonate. When the amount used for the treatment is less than 0.1% by weight, the workability, adhesiveness and weather-resistant adhesion may not be improved to a sufficient extent. When it exceeds 20% by weight, the storage stability of the curable composition may decrease.

<Addition Level>

When a filler is used, the level of addition thereof is preferably within the range of 5 to 1,000 parts by weight, more preferably within the range of 20 to 500 parts by weight, most preferably within the range of 40 to 300 parts by weight, per 100 parts by weight of the sum of the polyether polymer (I) and vinyl polymer (II). When the addition level is below 5 parts by weight, the improving effects on the breaking strength, elongation at break, adhesiveness and weather-resistant adhesion may be insufficient and, when it exceeds 1,000 parts by weight, the workability of the curable composition may decrease in certain instances. A single filler may be used alone or two or more fillers may be used in combination.

<Physical Property Modifiers>

One or more physical property modifiers may be added to the curable composition of the present invention according to need for adjusting the tensile characteristics of the resulting cured products.

The physical property modifier is not particularly restricted but includes, among others, alkylalkoxysilanes such as methyltrimethoxysilane, dimethyldimethoxysilane, trimethylmethoxysilane and n-propyltrimethoxysilane; functional group-containing alkoxysilanes, for example alkylisopropenoxysilanes such as dimethyldiisopropenoxysilane, methyltriisopropenoxysilane and γ-glycidoxypropylmethyldiisopropenoxysilane, γ-glycidoxypropylmethyldimethoxysilane, γ-glycidoxypropyltrimethoxysilane, vinyltrimethoxysilane, vinyldimethylmethoxysilane, γ-aminopropyltrimethoxysilane, N-(β-aminoethyl)aminopropylmethyldimethoxysilane, γ-mercaptopropyltrimethoxysilane and γ-mercaptopropylmethyldimethoxysilane; silicone varnishes; and polysiloxanes. By using such physical property modifier(s), it becomes possible to increase or decrease the hardness and/or attain elongation properties at the time of curing of the composition of the present invention. The physical property modifies such as mentioned above may be used singly or two or more of them may be used in combination.

<Thixotropy Providing Agent (Antisagging Agent)>

A thixotropy providing agent (antisagging agent) may be added to the curable composition of the present invention according to need for sagging prevention and workability improvement.

The antisagging agent is not particularly restricted but includes, among others, polyamide waxes; hydrogenated castor oil and derivatives thereof; and metal soaps such as calcium stearate, aluminum stearate and barium stearate. These thixotropy providing agents (antisagging agents) may be used singly or two or more of them may be used in combination.

Other Additives

Where necessary, one or more of various additives may be added to the curable composition of the present invention for the purpose of adjusting various physical properties of the curable composition and/or cured products. As examples of such additives, there may be mentioned, among others, flame retardants, curability adjusting agents, antioxidants, radical inhibitors, ultraviolet absorbers, metal deactivators, antiozonants, light stabilizers, phosphorus-containing peroxide decomposers, lubricants, pigments, foaming or blowing agents, antifungal agents, rust preventives, and photocurable resins. These various additives may be used singly or two or more species may be used in combination.

Specific examples of these additives are described, for example, in Japanese Kokoku Publication Hei-04-69659, Japanese Kokoku Publication Hei-07-108928, Japanese Kokai Publication Sho-63-254149 and Japanese Kokai Publication Sho-64-22904.

The curable composition of the present invention may be prepared as a one-pack formulation by compounding all the ingredients in advance and storing the resulting compound in a tightly closed container, which formulation, when applied, undergoes curing by atmospheric moisture, or as a two-pack formulation by separately compounding a curing catalyst, filler, plasticizer, water and other ingredients in advance. In the latter case, the compound is admixed with the polymer composition prior to use. In the case of such two-pack formulation, a colorant can be added in the step of mixing the two components and thus it becomes possible to prepare a rich assortment of colors with limited stocks in providing sealing materials matched in color to the color of siding boards, for instance. Thus, two-pack formulations make it easy to cope with the market demand for multicolor systems, hence are more preferred for use in low-rise buildings or the like. The colorant, when prepared, for example in the form of a paste by blending a pigment and plasticizer, optionally together with a filler, facilitates the application work. Further, by adding a retarder in blending the two components together, it is possible to exactly adjust the curing rate at the site of application.

<<Cured Products>>

It is preferred that cured products not thicker than 100 µm as obtained by curing, without adding any filler or like additive, the curable composition according to the invention which comprises the polyether polymer (I), vinyl polymer (II) and compatibilizing agent (IV) show a level of weatherability not shorter than 20 hours in sunshine weatherometer testing.

In the practice of the present invention, the weatherability of each cured product not thicker than 100 µm is evaluated by visual observation of the cured product surface. That the weatherability is not shorter than 20 hours, for instance, means that the initial good surface condition is maintained for not shorter than 20 hours without showing surface waviness or flatting out due to polymer elution, cracking, discoloration (in the case of colored products), chalking or other changes.

In the practice of the present invention, the weatherability testing refers to the WS type test according to JIS A 1415.

<Uses>

The curing composition of the present invention can be used in various fields of application which include, but are not limited to, sealing materials, for example sealing materials such as elastic sealing materials for building and construction and sealing materials for laminated glass, electric and electronic part materials such as solar cell back sealers, electric insulating materials such as wire/cable insulating sheath, pressure-sensitive adhesive materials, adhesives, elastic adhesives, paints, powder paints, coating compositions, foamed bodies, potting materials for electric and electronic use, films, gaskets, casting materials, various molding materials, and rustproof and waterproof sealants for end faces (cut sections) of net glass or laminated glass.

BETS MODES FOR CARRYING OUT THE INVENTION

In the following, specific examples according to the present invention and comparative examples are given to illustrate the present invention. The following examples are, however, by no means limitative of the scope of the present invention.

In the following examples and comparative examples, "part(s)" and "%" mean "part(s) by weight" and "% by weight", respectively.

In the following examples, the "number average molecular weigh" and "molecular weight distribution (ratio of weight average molecular weight to number average molecular weight)" were calculated by the standard polystyrene equivalent method using gel permeation chromatography (GPC). The GPC column used was one packed with crosslinked polystyrene in a gel form (Shodex GPC K-804; product of Showa Denko) and the GPC solvent used was chloroform.

SYNTHESIS EXAMPLE 1

Synthesis of a Crosslinkable Silyl Group-Terminated poly (n-butyl acrylate/stearyl acrylate) Copolymer A 2-liter flask was charged with 8.39 g (58.5 mmol) of cuprous bromide and 112 mL of acetonitrile, and the contents were heated at 70° C. with stirring under a nitrogen stream for 20 minutes. Thereto were added 17.6 g (48.8 mmol) of diethyl 2,5-dibromoadipate, 996 mL (6.94 mol) of butyl acrylate and 279 g (0.858 mol) stearyl acrylate, and the mixture was further heated at 70° C. for 40 minutes with stirring. Thereto was added 0.41 mL (1.95 mmol) of pentamethyldiethylenetriamine (hereinafter referred to as "triamine") to thereby initiate the reaction. Then, heating at 70° C. was continued with stirring, and 2.05 mL (9.75 mmol) of triamine was added. At 330 minutes after the start of the reaction, 288 mL (1.95 mol) of 1,7-octadiene and 4.1 mL (19.5 mmol) of triamine were added, and heating at 70° C. was continued with stirring. At 570 minutes after the start of the reaction, the heating was stopped. The reaction mixture was diluted with toluene and then filtered, and the filtrate was treated by heating under reduced pressure to give a polymer (polymer [1]). The polymer [1] obtained had a number average molecular weight of 28,800 as determined by GPC (mobile phase: chloroform; calculated on the polystyrene equivalent basis) with molecular weight distribution of 1.33. The number of alkenyl groups per polymer molecule as determined by $^1$H-NMR spectrometry was 2.9.

In a nitrogen atmosphere, a 2-liter flask was charged with the polymer obtained in the above manner, 17.2 g (0.175 mol) of potassium acetate and 700 mL of DMAc, and the contents were heated at 100° C. with stirring for 10 hours. The DMAc was removed from the reaction mixture by heating under reduced pressure, toluene was added, and the mixture was filtered. The filtrate was deprived of the volatile matter by heating under reduced pressure and then charged into a 2-liter flask, an adsorbent (10 g, 1:1 mixture of Kyowaad 500SN and Kyowaad 700SN, products of Kyowa Chemical) was added, and the mixture was heated at 130° C. with stirring under a nitrogen stream for 9 hours. After dilution with toluene and removal of the adsorbent by filtration, the toluene was distilled off from the filtrate under reduced pressure to give a polymer (polymer [2]).

A one-liter pressure reaction vessel was charged with the polymer [2] (700 g), dimethoxymethylhydrosilane (26.1 mL, 0.212 mol), methyl orthoformate (7.71 mL, 0.0705 mol) and platinum(0)-1,1,3,3-tetramethyl-1,3-divinyldisiloxane complex. The amount of the platinum catalyst used was such that the mole ratio thereof to the alkenyl group in the polymer amounted to $9 \times 10^{-3}$ equivalents. The mixture was heated at 100° C. for 195 minutes with stirring. The volatile matter was then distilled off from the mixture under reduced pressure, whereby a silyl group-terminated polymer (polymer [3]) was obtained. The polymer obtained had a number average molecular weight of 35,900 as determined by GPC (on the polystyrene equivalent basis) with a molecular weight distribution of 1.9. The average number of the silyl groups introduced per polymer molecule as determined by $^1$H-NMR spectrometry was 2.1.

SYNTHESIS EXAMPLE 2

Synthesis of a Crosslinkable Silyl Group-Terminated poly (n-butyl acrylate)

A 2-liter flask was charged with 8.39 g (58.5 mmol) of cuprous bromide and 112 mL of acetonitrile, and the contents were heated at 70° C. with stirring under a nitrogen stream for 30 minutes. Thereto were added 17.6 g (48.8 mmol) of diethyl 2, 5-dibromoadipate and 224 mL (1.56 mol) of butyl acrylate, and the mixture was further heated at 70° C. with stirring for 45 minutes. Thereto was added 0.41 mL (1.95 mmol) of pentamethyldiethylenetriamine (hereinafter referred to as "triamine"), and the reaction was thereby started. While continued heating at 70° C. with stirring, 895 mL (6.24 mol) of butyl acrylate was added dropwise intermittently over 160 minutes beginning at 80 minutes after start of the reaction. During this dropping, 1.84 mL (8.81 mmol) of triamine was added. After the lapse of 375 minutes after start of the reaction, 288 mL (1.95 mol) of 1,7-octadiene and 4.1 mL (19.5 mmol) of triamine were added, and the heating at 70° C. with stirring was further continued. At 615 minutes after start of the reaction, the heating was stopped. The reaction mixture was diluted with toluene and filtered, and the filtrate was heated under reduced pressure to give a polymer (polymer [4]). The polymer [4] had a number average molecular weight of 24,100 as determined by GPC (mobile phase: chloroform; on the polystyrene equivalent basis) with a molecular weight distribution of 1.27. The number of alkenyl groups as determined by $^1$H-NMR spectrometry was 2.6 per polymer molecule.

In anitrogen atmosphere, a 2-liter flask was charged with the thus-obtained polymer, 11.9 g (0.121 mol) of potassium acetate and 900 mL of DMAc, and the mixture was heated at 100° C. with stirring for 11 hours. The DMAc was removed by heating the reaction mixture under reduced pressure, toluene was added, and the mixture was filtered. An adsorbent (200 g, Kyowaad 700PEL, product of Kyowa Chemical) was added to the filtrate, and the mixture was heated at 100° C. with stirring under a nitrogen stream for 3 hours. The adsorbent was filtered off, and the toluene was distilled off from the filtrate under reduced pressure to give a polymer (polymer [5]).

A one-liter pressure reaction vessel was charged with the polymer [5] (648 g), dimethoxymethylhydrosilane (25.5 mL, 0.207 mol), methyl orthoformate (7.54 mL, 0.0689 mol) and platinum(0)-1,1,3,3-tetramethyl-1,3-divinyldisiloxane complex. The amount of the platinum catalyst used was such that the mole ratio thereof to the alkenyl group in the polymer amounted to $3 \times 10^{-3}$ equivalents. The mixture was heated at 100° C. with stirring for 2 hours. The volatile matter was then distilled off from the mixture under reduced pressure, whereby a silyl group-terminated vinyl polymer (polymer [6]) was obtained. The polymer obtained had a number average molecular weight of 29,600 as determined by GPC (on the polystyrene equivalent basis) with a molecular weight distribution of 1.9. The average number of the silyl groups introduced per polymer molecule as determined by $^1$H-NMR spectrometry was 1.9.

EXAMPLES 1 TO 5

The crosslinkable silyl group-containing vinyl polymer of Synthesis Example 1 was blended with a commercially available, crosslinkable silyl group-terminated polyether polymer (S203, product of Kaneka Corporation) in various mixing ratios shown in Table 1, and the mixtures were evaluated for compatibility by visual observation. Each mixture (100 parts by weight) was blended under stirring with 1 part by weight of water and 1 part by weight of dibutyltin dimethoxide, the whole mixture was defoamed at room temperature using a vacuum drier, and then curing was allowed to proceed at 50° C. for 3 days to give a rubber-like cured product. The results thus obtained are shown in Table 1.

COMPARATIVE EXAMPLES 1 to 5

Compatibility observations were made and cured products were obtained in the same manner as in Examples 1 to 5 except that the polymer obtained in Synthesis Example 2 was used in lieu of the polymer obtained in Synthesis Example 1. The results are also shown in Table 1.

TABLE 1

|  | Example | | | | | Comparative Example | | | | |
| --- | --- | --- | --- | --- | --- | --- | --- | --- | --- | --- |
|  | 1 | 2 | 3 | 4 | 5 | 1 | 2 | 3 | 4 | 5 |
| Vinyl polymer of Synthesis Example 1 | 10 | 30 | 50 | 70 | 90 | — | — | — | — | — |
| Vinyl polymer of Synthesis Example 2 | — | — | — | — | — | 10 | 30 | 50 | 70 | 90 |
| Polyether polymer | 90 | 70 | 50 | 30 | 10 | 90 | 70 | 50 | 30 | 10 |
| Compatibility | ○ | ○ | ○ | ○ | ○ | x | x | x | x | x |
| Curing product homogeneity | ○ | ○ | ○ | ○ | ○ | x | x | x | x | x |

Blending of the polymer of Synthesis Example 1 with the polyether polymer gave homogeneous mixtures, and the mixtures gave homogeneous cured products. On the contrary, blending of the polymer of Synthesis Example 2 with the polyether polymer gave nonhomogeneous mixtures, and the mixtures gave only nonhomogenous cured products.

EXAMPLE 6

A commercially available, crosslinkable silyl group-containing polyether polymer (S303; Kaneka Corporation; 70 parts) was mixed, under stirring, with 30 parts of the 4 crosslinkable silyl group-containing vinyl polymer of Synthesis Example 1. This polymer mixture (100 parts) was mixed, under stirring, with 120 parts of calcium carbonate (Hakuenka CCR; product of Shiraishi Calcium), 20 parts of titanium oxide (TIPAQUE R-820; Ishihara Sangyo), 55 parts of a plasticizer (DIDP; Daihachi Chemical Industry), 2 parts of an antisagging agent (DISPARLON #6500; Kusumoto Chemicals), 1 part of an ultraviolet absorber (TINUVIN 327; Ciba Specialty Chemicals), 1 part of a light stabilizer (LS-770; Sankyo organic Chemicals), 2 parts of a dehydrating agent (A-171 (VTMO); Nippon Unicar), 3 parts of an adhesiveness providing agent (A-1120 (DAMO); Nippon Unicar) and 2 parts of a curing catalyst (U-220; Nitto Kasei), and the same test specimens as those for H tensile bond strength testing according to JIS A 5758 were prepared and subjected to 2 days of indoor curing and 3 days of curing at 50° C. to give cured products.

COMPARATIVE EXAMPLE 6

Cured products were produced in the same manner as in Example 6 except that 100 parts of a commercially available, crosslinkable silyl group-containing polyether polymer (S303; Kaneka Corporation) was used in lieu of 100 parts of the polymer mixture used in Example 6.

No. 2 (⅓) dumbbell test specimens (JIS K 7113) were punched out from the cured products obtained in Example 6 and Comparative Example 6 and measured for breaking strength (Tb) and elongation at break(Eb) using a Shimadzu autograph (measurement environment: 23° C., rate of pulling: 200 mm/min) The results are shown in Table 2.

TABLE 2

| | Formulation | | |
|---|---|---|---|
| Name | Particulars | Example 6 | Comparative Example 6 |
| Polyether polymer | S-303 | 70 | 100 |
| Vinyl polymer | Synthesis Example 1 | 30 | — |
| Calcium carbonate | CCR | 120 | 120 |
| Titanium oxide | TIPAQUE R-820 | 20 | 20 |
| Plasticizer | DIDP | 55 | 55 |
| Antisagging agent | DISPARLON #6500 | 2 | 2 |
| Ultraviolet absorber | TINUVIN 327 | 1 | 1 |
| Light stabilizer | LS-770 | 1 | 1 |
| Dehydrating agent | A-171 (VTMO) | 2 | 2 |
| Adhessiveness providing agent | A-1120 (DAMO) | 3 | 3 |
| Curing catalyst | U-220 | 2 | 2 |
| Total | | 306 | 306 |
| Mechanical property test results | | | |
| Tb (MPa) | | 1.47 | 1.77 |
| Eb (%) | | 440 | 430 |

Even when the vinyl polymer of Synthesis Example 1 was blended with the polyether polymer, cured products comparable in mechanical properties could be obtained.

SYNTHESIS EXAMPLE 3
Synthesis of Compatibilizing Agent [1]

A 50-mL flask was charged with 0.300 g (2.09 mmol) of cuprous bromide and 3.00 mL of acetonitrile, and the contents were heated at 70° C. with stirring under a nitrogen stream for 40 minutes. Thereto were added 0.778 mL (6.98 mmol) of methyl 2-propionate, 10.0 mL (69.6 mmol) of butyl acrylate and 14.1 mL (69.6 mmol) of methoxydipropylene glycol acrylate, and the mixture was further heated at 70° C. with stirring for 30 minutes. Thereto was added 0.07 mL (0.35 mmol) of pentamethyldiethylenetriamine (hereinafter referred to as "triamine"), and the reaction was thereby started. While continued heating at 70° C. with stirring, 0.35 mL (1.75 mmol) of triamine was added. After the lapse of 290 minutes after start of the reaction, the temperature was raised to 90° C. and the heating with stirring was further continued for 70 minutes. The reaction mixture was diluted with toluene and filtered, and the filtrate was heated under reduced pressure to give a compatibilizing agent (compatibilizing agent [1]). The compatibilizing agent [1] obtained had a number average molecular weight of 3,870 as determined by GPC (mobile phase: chloroform; on the polystyrene equivalent basis) with a molecular weight distribution of 1.17.

SYNTHESIS EXAMPLE 4
Synthesis of Compatibilizing Agent [2]

A compatibilizing agent (compatibilizing agent [2]) was obtained in the same manner as in Synthesis Example 3 except that the amount of butyl acrylate was 6.00 mL (41.9 mmol) and the amount of methoxydipropylene glycol acrylate was 19.7 mL (97.7 mmol). The compatibilizing agent [2] obtained had a number average molecular weight of 3,790 as determined by GPC (mobile phase: chloroform; on the polystyrene equivalent basis) with a molecular weight distribution of 1.18.

SYNTHESIS EXAMPLE 5
Synthesis of compatibilizing agent [3]

A compatibilizing agent (compatibilizing agent [3]) was obtained in the same manner as in Synthesis Example 3 except that the amount of butyl acrylate was 2.00 mL (14.0 mmol) and the amount of methoxydipropylene glycol acrylate was 25.3 mL (126 mmol). The compatibilizing agent [3] obtained had a number average molecular weight of 3, 620 as determined by GPC (mobile phase: chloroform; on the polystyrene equivalent basis) with a molecular weight distribution of 1.17.

EXAMPLES 7 TO 9

The crosslinkable silyl group-containing vinyl polymer of Synthesis Example 2 was blended with a commercially available, crosslinkable silyl group-containing polyether polymer (S203HE, product of Kaneka Corporation) and one of the compatibilizing agents [1] to [3] in the mixing ratio shown in Table 3, and the mixtures were evaluated for compatibility by visual observation. Each mixture (100 parts by weight) was blended under stirring with 1 part by weight of water and 1 part by weight of dibutyltin dimethoxide, the whole mixture was degassed at room temperature using a vacuum drier, and then curing was allowed to proceed at 50° C. for 3 days to give a rubber-like cured product. The results thus obtained are shown in Table 3.

COMPARATIVE EXAMPLE 7

A compatibility observation was made and a cured product was obtained in the same manner as in Examples 7 to 9 except that the compatibilizing agent was not used. The results are also shown in Table 3.

TABLE 3

| | Example 7 | Example 8 | Example 9 | Comparative Example 3 |
|---|---|---|---|---|
| Vinyl polymer of Synthesis Example 2 | 30 | 30 | 30 | 30 |
| Polyether polymer (S203HE) | 70 | 70 | 70 | 70 |
| Compatibilizer [1] | 10 | — | — | — |
| Compatibilizer [2] | — | 10 | — | — |
| Compatibilizer [3] | — | — | 10 | — |
| Compatibility | ○ | ○ | ○ | x |
| Curing product homogeneity | ○ | ○ | ○ | x |

Blending of the mixture of the polyether polymer and the vinyl polymer of Synthesis Example 2 with the compatibilizing agents gave homogeneous mixtures, and the mixtures gave homogeneous cured products. On the contrary, nonhomogeneous mixtures were obtained without using any compatibilizing agent, and the mixtures gave only nonhomogenous cured products.

SYNTHESIS EXAMPLE 6

A 50-L reaction vessel equipped with a reflux column and a stirrer was charged with a suspension of CuBr (251.82 g, 1.76 mol) in acetonitrile (2, 640 g), the reactor inside was sealed with nitrogen, and the contents were then stirred at 65° C. for 30 minutes. Thereto were added butyl acrylate (6.0 kg), diethyl 2,5-dibromoadipate (526.70 g, 1.46 mol), acetonitrile (695 g) and pentamethyldiethylenetriamine (hereinafter referred to as "triamine")(12.0 mL, 58.5 mmol) to thereby initiate the reaction. While heating at 80° C. with stirring, butyl acrylate (24.0 kg) was continuously added dropwise. During the dropping of butylacrylate, triamine (36.0 mL, 176 mmol) was added. Then, while continued heating at 80° C. with stirring, 1,7-octadiene (6.448 kg) and triamine (120.0 mL, 585 mmol) were added. The resulting mixture was further heated at 800C with stirring for 4 hours. Then, the heating with stirring was once discontinued, triamine (80.0 mL, 390 mmol) was added, and the mixture was heated at 90° C. with stirring for 4 hours to give a reaction mixture containing a polymer (polymer [1]) (polymerization reaction mixture [1']).

The polymer [1] had a number average molecular weight of 23,600 as determined by GPC (on the polystyrene equivalent basis) with a molecular weight distribution of 1.21. The average number of alkenyl groups introduced per polymer molecule was 2.9 as determined by $^1$H NMR analysis.

EXAMPLE 10

A curable composition was prepared by thoroughly blending 50 parts of the polymer [1] obtained in Synthesis Example 6 and 50 parts of a commercially available, crosslinkable silyl group-containing polyether polymer (S203, product of Kaneka Corporation) with a compatibilizing agent.(DIDP (diisodecyl phthalate), product of Kyowa Hakko).

COMPARATIVE EXAMPLE 8

A curable composition was prepared in the same manner as in Example 10 except that the compatibilizing agent was not added.
(Evaluation 1)

The curable compositions obtained in Example 10 and Comparative Example 8 were respectively placed in glass bottles and, after sealing, allowed to stand at room temperature (15 to 23° C.) for 1 day and, then, observed for their conditions. The curable composition of Example 10 showed compatibility without any boundary face being confirmed upon visual observation whereas a boundary line was confirmed by visual observation with the curable composition of Comparative Example 8.

EXAMPLE 11

One part of a tetravalent tin catalyst (dibutyltin diacetylacetonate) was thoroughly admixed with 100 parts of the curable composition of Example 10, and the blend was poured into an aluminum mold (about 80 mm×about 60 mm×about 2 mm) and allowed to stand at room temperature for 2 days and then at 50° C. for 3 days to give a sheet-like cured product.

COMPARATIVE EXAMPLE 9

One part of a tetravalent tin catalyst (dibutyltin diacetylacetonate) was thoroughly admixed with 100 parts of the curable composition of Comparative Example 8, and the blend was poured into an aluminum mold (about 80 mm×about 60 mm×about 2 mm) and allowed to stand at room temperature for 2 days and then at 50° C. for 3 days to give a sheet-like cured product.
(Evaluation 2)

No. 2 (⅓) dumbbell test specimens (JIS K 7113) were punched out from the cured products obtained in Example 11 and Comparative Example 9 and measured for elongation at break (Eb) using a Shimadzu autograph (measurement environment: 23° C., rate of pulling: 200 mm/min). The results are shown in Table 4. A higher elongation was obtained in Example 11 as compared with Comparative Example 9.

TABLE 4

|  | Eb (%) |
| --- | --- |
| Example 11 | 390 |
| Comparative Example 9 | 330 |

EXAMPLE 12

One part of a tetravalent tin catalyst (dibutyltin diacetylacetonate) was thoroughly admixed with 100 parts of the curable composition of Example 10, and the blend was applied to an about 100-μm-thick aluminum sheet and allowed to stand at room temperature for 2 days and then at 50° C. for 3 days to give a cured product.

COMPARATIVE EXAMPLE 10

One part of a tetravalent tin catalyst (dibutyltin diacetylacetonate) was thoroughly admixed with 100 parts of the curable composition of Comparative Example 8, and the blend was applied to an about 100-μm-thick aluminum sheet and allowed to stand at room temperature for 2 days and then at 50° C. for 3 days to give a cured product.
(Evaluation 3)

The cured products obtained in Example 12 and Comparative Example 10 were tested for weatherability using a sunshine weatherometer (Suga Test Instruments model WEL-SUN-DC, black panel temperature 63° C., 18 minutes of raining per 2 hours of irradiation). After the predetermined period of weatherability testing, the surface condition of each product was observed. The cured product of Example 12 was observed for surface condition after 20 hours and 48 hours of irradiation in the sunshine weatherometer. The results are shown in Table 5.

TABLE 5

|  | After 20 hours of weathering testing | After 48 hours of weathering testing |
| --- | --- | --- |
| Example 12 | ○ | Δ |
| Comparative Example 10 | x | — |

○: No change.
Δ: Slight change in form.
x: Dissolution ocurred and the original form was lost.

INDUSTRIAL APPLICABILITY

The curable composition of the present invention, which has the above-mentioned constitution, is excellent in storage stability, gives cured products high in gel fraction and elongation, excellent in weatherability, among others, and uniform in appearance.

What is claimed is:

1. A curable composition which comprises the following three components:

(I) a polyether polymer having at least one crosslinkable functional group, (II) a vinyl polymer incompatible with said polyether polymer and having at least one crosslinkable functional group, and (III) a compatibilizing agent produced by copolymerization of a plurality of vinyl monomers and capable of compatibilizing said polyether polymer and said vinyl polymer with each other when added to a mixture thereof, wherein said compatibilizing agent is obtained by the copolymerization of at least one vinyl monomer selected from among the monomers used in polymerizing the vinyl polymer (II), with a vinyl monomer having a polyether structure.

2. The curable composition according to claim 1, wherein the main chain of the polyether polymer (I) is essentially a polyoxyalkylene.

3. The curable composition according to claim 2 wherein the main chain of the polyether polymer (I) is essentially polypropylene oxide.

4. The curable composition according to claim 1, wherein the crosslinkable functional group of the polyether polymer (I) is a crosslinkable silyl group.

5. The curable composition according to claim 1, wherein the vinyl polymer (II) has a number average molecular weight of not less than 3,000 as determined by gel permeation chromatography.

6. The curable composition according to claim 1, wherein the main chain of the vinyl polymer (II) is obtained by polymerizing principally at least one monomer selected from the group consisting of (meth)acrylic monomers, acrylonitrile monomers, aromatic vinyl monomers, fluorine-containing vinyl monomers and silicon-containing vinyl monomers.

7. The curable composition according to claim 1, wherein the vinyl polymer (II) comprises (meth)acrylic acid ester units having, in the ester moiety thereof, a group selected from the group consisting of alkyl groups containing 5 to 30 carbon atoms, aryl groups containing 6 to 30 carbon atoms and aralkyl groups containing 7 to 30 carbon atoms.

8. The curable composition according to claim 6, wherein the vinyl polymer (II) is a (meth)acrylic polymer.

9. The curable composition according to claim 1, wherein the crosslinkable functional group of the vinyl polymer (II) is a crosslinkable silyl group.

10. The curable composition according to claim 1, wherein the crosslinkable functional group of the vinyl polymer (II) is an alkenyl group.

11. The curable composition according to claim 1, wherein the crosslinkable functional group of the vinyl polymer (II) is a hydroxyl group.

12. The curable composition according to claim 1, wherein the crosslinkable functional group of the vinyl polymer (II) is an amino group.

13. The curable composition according to claim 1, wherein the crosslinkable functional group of the vinyl polymer (II) is a polymerizable carbon-carbon double bond-containing group.

14. The curable composition according to claim 1, wherein the crosslinkable functional group of the vinyl polymer (II) is an epoxy group.

15. The curable composition according to claim 1, wherein the main chain of the vinyl polymer (II) is one produced by a living radical polymerization technique.

16. The curable composition according to claim 15, wherein the living radical polymerization technique is an atom transfer radical polymerization.

17. The curable composition according to claim 1, which the cured product is derived therefrom by curing without using any filler and having a thickness of not more than 100 μm shows a level of weatherability which is not shorter than 20 hours in sunshine weathermeter testing.

18. The curable composition according to claim 1, wherein concerning said compatibilizing agent (III), the mole ratio between the at least one vinyl monomer selected from among the monomers used in polymerizing the vinyl polymer (II), and the vinyl monmer having a polyether structure is within the range of 1:20 to 20:1.

19. The curable composition according to claim 1, wherein said compatibilizing agent (III) has a number average molecular weight of 500 to 50,000 as determined by gel permeation chromatography.

20. The curable composition according to claim 1, wherein said polyether structure is essentially polypropylene oxide.

21. The curable composition according to claim 1, wherein said vinyl monomer in said compatibilizing agent (III) is a (meth) acrylic monomer.

22. The curable composition according to claim 1, wherein said compatibilizing iagent (III) is produced by a living radical polymerization technique.

23. The curable composition according to claim 22, wherein said living radical polymerization technique consists in atom transfer radical polymerization.

* * * * *